United States Patent
Andersson et al.

(10) Patent No.: US 12,003,785 B2
(45) Date of Patent: Jun. 4, 2024

(54) ASYMMETRIC DEBLOCKING IN A VIDEO ENCODER AND/OR VIDEO DECODER

(71) Applicant: Telefonaktiebolaget LM Ericsson (publ), Stockholm (SE)

(72) Inventors: Kenneth Andersson, Gävle (SE); Jack Enhorn, Kista (SE); Zhi Zhang, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/132,889

(22) Filed: Apr. 10, 2023

(65) Prior Publication Data

US 2023/0319318 A1 Oct. 5, 2023

Related U.S. Application Data

(63) Continuation of application No. 17/532,321, filed on Nov. 22, 2021, now Pat. No. 11,653,030, which is a
(Continued)

(51) Int. Cl.
*H04N 19/86* (2014.01)
*H04N 19/176* (2014.01)
*H04N 19/96* (2014.01)

(52) U.S. Cl.
CPC ......... *H04N 19/865* (2014.11); *H04N 19/176* (2014.11); *H04N 19/86* (2014.11); *H04N 19/96* (2014.11)

(58) Field of Classification Search
CPC .... H04N 19/865; H04N 19/176; H04N 19/86; H04N 19/96; H04N 19/136; H04N 19/157; H04N 19/182; H04N 19/117
See application file for complete search history.

(56) References Cited

U.S. PATENT DOCUMENTS

2003/0053708 A1 3/2003 Kryukov et al.
2004/0101059 A1 5/2004 Joch et al.
(Continued)

FOREIGN PATENT DOCUMENTS

CN 1525439 A 9/2004
CN 101754010 A 6/2010
(Continued)

OTHER PUBLICATIONS

Sjöberg, R., et al., "Description of SDR and HDR video coding technology proposal by Ericsson and Nokia", Joint Video Exploration Team (JVET) of ITU-T SG 16 WP3 and ISO/IEC JTC 1/SC 29/WG 11, Document: JVET-J0012-v1, 10th Meeting: San Diego, CA USA, Apr. 2018 (32 pages).
(Continued)

*Primary Examiner* — Howard D Brown, Jr.
(74) *Attorney, Agent, or Firm* — Rothwell, Figg, Ernst & Manbeck, P.C.

(57) ABSTRACT

An asymmetric deblocking method for deblocking a boundary between a P block and a Q block such that 5 samples within the P block and 7 or 3 samples within the Q block are modified. The method includes determining a value refP based on at least p5, determining a value refQ based on at least qx, wherein qx is q3 or q7; determining a value refMiddle based on at least p0 and q0, wherein p0 is directly adjacent to the boundary and q0 is directly adjacent to the boundary; performing a linear interpolation between refP and refMiddle; and performing a linear interpolation between refQ and refMiddle.

19 Claims, 15 Drawing Sheets

Related U.S. Application Data continuation of application No. 16/642,748, filed as application No. PCT/SE2019/051109 on Nov. 4, 2019, now Pat. No. 11,197,032.

(60) Provisional application No. 62/757,536, filed on Nov. 8, 2018.

(56) References Cited

U.S. PATENT DOCUMENTS

| | | | |
|---|---|---|---|
| 2013/0022107 A1 | 1/2013 | Van der Auwera et al. | |
| 2013/0028331 A1 | 1/2013 | Min et al. | |
| 2013/0121408 A1 | 5/2013 | Chono et al. | |
| 2013/0294525 A1 | 11/2013 | Norkin et al. | |
| 2016/0219298 A1 | 7/2016 | Li et al. | |
| 2016/0286155 A1 | 9/2016 | Bhuvanagiri et al. | |
| 2018/0184127 A1 | 6/2018 | Zhang et al. | |
| 2018/0199034 A1 | 7/2018 | Nam et al. | |
| 2020/0068223 A1* | 2/2020 | Rusanovskyy | H04N 19/176 |
| 2021/0152852 A1* | 5/2021 | Andersson | H04N 19/176 |

FOREIGN PATENT DOCUMENTS

| | | |
|---|---|---|
| CN | 102870411 A | 1/2013 |
| CN | 103718552 | 4/2014 |
| CN | 106464866 A | 2/2017 |
| CN | 108012155 A | 5/2018 |

OTHER PUBLICATIONS

Andersson, K., et al., "CE2-2.1.1: Long deblocking filters and fixes", Joint Video Experts Team (JVET) of ITU-T SG 16 WP 3 and ISO/IEC JTC 1/SC 29/WG 11, Document: JVET-K0307-v1, 11th Meeting: Ljubljana, SI, Jul. 2018 (6 pages).

International Search Report and Written Opinion dated Feb. 13, 2020 issued in International application No. PCT/SE2019/051109. (15 pages).

Ikeda, M. et al., "CE11.1.6, CE11.1.7 and CE11.1.8: Joint proposals for long deblocking from Sony, Qualcomm, Sharp, Ericsson", Joint Video Experts Team (JVET) of ITU-T SG 16 WP 3 and ISO/IEC JTC 1/SC 29/WG 11; 13th Meeting; Marrakesh, MA; Document: JVET-M0471; (Jan. 2019) (11 pages).

Norkin, A., et al., "Description of Core Experiment 11 (CE11): Deblocking", Joint Video Experts Team (JVET) of ITU-T SG 16 WP 3 and ISO/IEC JTC 1/SC 29/WG 11; 12th Meeting; Macao, CN; Document: JVET-L1301-v3; (Oct. 2018). (19 pages).

Andersson, K., et al., "CE11: Long deblocking filters for luma (CE11.1.1) and for both luma and chroma (CE11.1.9)", Joint Video Experts Team (JVET) of ITU-T SG 16 WP 3 and ISO/IEC JTC 1/SC 29/WG 11; 12th Meeting; Macao, CN; Document: JVET-L0072; (Oct. 2018). (7 pages).

Bross, B., et al., "Versatile Video Coding (Draft 3)"; Joint Video Experts Team (JVET) of ITU-T SG 16 WP 3 and ISO/IEC JTC 1/SC 29/WG 11; 12th Meeting; Macao, CN; Document: JVET-L1001-v1; (Oct. 2018). (160 pages).

Bross, B., et al., "Versatile Video Coding (Draft 3)"; Joint Video Experts Team (JVET) of ITU-T SG 16 WP 3 and ISO/IEC JTC 1/SC 29/WG 11; 12th Meeting; Macao, CN; Document: JVET-L1001-v9; (Oct. 2018). (233 pages).

Norkin, A. et al., "CE11: Summary Report on Deblocking", Joint Video Experts Team (JVET) of ITU-T SG 16 WP 3 and ISO/IEC JTC 1/SC 29/WG 11; 12th Meeting: Macao, CN, Oct. 3-12, 2018; Document: JVET-L0031-v3. (34 pages).

* cited by examiner

ASYMMETRIC DEBLOCKING IN A VIDEO ENCODER AND/OR VIDEO DECODER

This application is a continuation of Ser. No. 17/532,321, filed Nov. 22, 2021 (now U.S. Pat. No. 11,653,030, issued on May 16, 2023), which is a continuation of U.S. application Ser. No. 16/642,748, filed on Feb. 27, 2020 (now U.S. Pat. No. 11,197,032, issued on Dec. 7, 2021), which is the 35 U.S.C. § 371 National Stage of International Patent Application No. PCT/SE2019/051109, filed Nov. 4, 2019, which claims priority to U.S. provisional application no. 62/757,536, filed on Nov. 8, 2018. The above identified applications are incorporated by this reference.

TECHNICAL FIELD

This disclosure relates to video encoding and/or decoding.

BACKGROUND

This disclosure relates to the encoding and/or decoding of a video sequence, which consists of a series of images (a.k.a., pictures). Each image of the video sequence consists of one or more components. Each component can be described as a two-dimensional rectangular array of sample values. It is common that an image in a video sequence consists of three components: one luma component Y where the sample values are luma values, a first chroma component Cb where the sample values are chroma values, and a second chroma component Cr where the sample values are chroma values. Other examples include Y' Cb Cr, Yuv and ICTCP. In ICTCP, I is the "intensity luma" component. For the remainder of this document we will refer to any luma component Y', Y or I as Y or simply luma.

It is common that the dimensions of the chroma components are smaller than the luma components by a factor of two in each dimension. For example, the size of the luma component of a High-Definition (HD) image would be 1920×1080 and the chroma components would each have the dimension of 960×540. Components are sometimes referred to as color components.

In video coding, each component is split into blocks and the coded video bitstream is a series of blocks. A block is one two-dimensional array of samples. It is common in video coding that the image is split into units that cover a specific area of the image. Each unit consist of all blocks from all components that make up that specific area and each block belongs fully to one unit. The macroblock in H.264 and the Coding unit (CU) in HEVC are examples of units.

In HEVC, each picture is partitioned into coding tree units (CTU). A CTU consist of an N×N block of luma samples and two M×M corresponding chroma blocks. A CTU in HEVC is like a macroblock in H.264 and earlier standards, but, in contrast to macroblocks, the CTU size is configurable. Most often, however, the CTU size in HEVC is set to 64×64 luma samples. Each CTU can be recursively quadtree split. The root of the quadtree is then associated with the CTU. The quadtree is split until a leaf is reached, which is referred to as the coding unit (CU). A CU in HEVC always consist of a luma block with equal height and width. How each CTU is split is conveyed in the bitstream. The CU is further the root node of two other trees, the prediction tree that has got prediction units (PUs) as nodes and the transform tree that has got transform units (TUs) as nodes. Some decoding processes in HEVC are done on the CU level, some are done on the PU level and some are done on the TU level. Boundaries between PUs and boundaries between TUs are filtered by a deblocking filter to reduce discontinuities between TUs and PUs. In HEVC there exist two kinds of prediction types for a PU, intra prediction which only uses prediction from previously decoded samples of the current picture for prediction, and inter prediction which uses prediction from at least one previously decoded picture.

In HEVC, deblocking is first applied on vertical boundaries and then on horizontal boundaries. The boundaries are either TU boundaries or PU boundaries. To enable parallel friendly deblocking (PDFD), the deblocking is performed on an 8×8 sample grid.

A deblocking filter strength parameter (bs) is set for each boundary. If the value of bs is larger than 0, then deblocking may be applied. The larger the boundary strength is, the stronger filtering is applied. First it is checked if any of the blocks at a PU boundary between the blocks is an intra predicted block then bs is set to=2, or if both blocks use inter prediction but and they use different reference frames or have significantly different motion vectors then bs is set to =1. It is also checked if a TU boundary between the blocks has non-zero transform coefficients in at least one of the blocks (code block flag CBF equal to 1), then bs is set to =1. This first checks sets a boundary strength (bs) which is larger than 0 to indicate that deblocking should be applied. The larger the boundary strength is the stronger filtering is applied. To reduce/avoid removing natural structures when deblocking, a check that there are not any natural structures on respective sides of the boundary is then applied for luma. In HEVC, gradient calculations are used on respective sides of the boundary using the following inequality: abs(p0−2*p1+p2)+abs(q0−2*q1+q2)<beta, where beta is a parameter based on the quantization parameter for the block and p0, p1, to p2 are samples on one side of the block boundary and q0, q1, to q2 are samples on the other side of the block boundary. The condition is checked at two positions along the boundary, and if both conditions are fulfilled, then the luma samples are deblocked for that 4 sample part of the boundary. Chroma boundaries may always be filtered if one any of the neighboring blocks are intra coded.

In the current draft of the specification for H.266 (VVC draft 3 JVET-L1001 (see reference [1]) (hereafter "VVC" for short)) a coding tree unit (CTU) is similar to the CTU in HEVC with the difference that the CTU in H.266 has a size of 128×128 luma samples. In VVC, the CTU can be split more flexibly such that a resulting CUs may consist of a rectangular luma block. In VVC, there is no prediction tree as in HEVC. However, a CU in VVC can implicitly be divided into multiple TUs. Implicit TUs can however only appear when the CU size has a width or height larger than the maximum transform size. If that is not the case, the CU does not have any prediction tree nor transform tree.

In VVC, deblocking is first applied on vertical CU boundaries and vertical implicit TU boundaries and vertical sub-block boundaries then on horizontal CU boundaries and horizontal implicit TU boundaries and horizontal sub-block boundaries. The deblocking is based on HEVC deblocking.

In VVC two sub-block prediction tools are included: AFFINE and ATMVP. A sub-block prediction tool can be characterized as a prediction tool that has more than one set of motion parameters for different parts of a block, e.g. sub-blocks. AFFINE operates on sub-block size 4×4 and ATMVP on sub-block size 8×8. Each sub-block is predicted by specific motion parameters such as at least one motion vector and one indicator of reference frame to predict from. When a CU uses sub-block motion compensation like ATMVP and AFFINE, sub-block boundaries can be created inside CU due to different motion parameters are used in at least some of the sub-blocks. In VVC, in addition to deblock CU and implicit TU boundaries on 8×8 grid also sub-block boundaries are deblocked on 8×8 grid when motion parameters on respective side of a sub-block boundary differs sufficiently. Both CU, implicit TU and sub-block boundaries can be deblocked in parallel since deblocking is based on HEVC luma deblocking that reads at most 4 samples and write of at most 3 samples, on each side of the boundary, which is sufficient for when deblocking on an 8×8 grid.

FIG. 1 shows an example of a vertical sub-block boundary 102 from ATMVP which is 8 samples from a vertical implicit TU boundary 101. FIG. 2A shows another example of a vertical sub-block boundary 202 that is 8 samples from a CU boundary 201. As shown in FIG. 2A, the vertical block boundary 201 is located between the P block and the Q block, which together form a unit, and the Q block has within it a number of vertical sub-block boundaries, including sub-block boundary 202 which is closest to boundary 201 and not coincident with boundary 201. FIG. 3A illustrates an example column 303 from the unit shown in FIG. 2A. As shown in FIG. 3A, the Q block includes a set of samples (a.k.a., pixel values) (samples Q1 to Q8 are shown) and the P block includes a set of samples (samples P1 to P8 are shown).

1. Deblocking Using Long Filters

Deblocking using longer filters, currently in core experiment on deblocking (JVET-L1031-v2), are typically applied for large blocks when at least the length orthogonal to the block boundary of the block on both sides are equal to or larger than 32 or equal to or larger than 16. There also exist cases where a longer filter is used on a side is equal to or larger than 32 and a shorter filter is used on the other side if that is smaller than 32.

1.1. Example of 8×8 Grid Luma Deblocking Using Long Filters from JVET-L1031-v3.

CE11.1.6

Test CE11.1.6 modifications include: long filter deblocking of luma, long filter deblocking of chroma, and position dependent clipping.

Long Deblocking Filter for Luma

The proposal uses a bilinear filter when samples at either one side of a boundary belong to a large block. A sample belonging to a large block is defined as when the width >=32 for a vertical edge, and when height>=32 for a horizontal edge.

The bilinear filter is listed below.

Block boundary samples $p_i$ and $q_i$ for i=0 to S−1 are then replaced by linear interpolation as follows:

$$p_i'=(f_i*Middle_{s,t}+(64-f_i)*P_s+32)>>6), \text{ clipped to } p_i \pm tcPD_i$$

$$q_i'=(g_i*Middle_{s,t}+(64-g_i)*Q_s+32)>>6), \text{ clipped to } q_i \pm tcPD_i$$

where $tcPD_i$ term is a position dependent clipping described in Section 2.5 and $f_i$, $Middle_{s,t}$, $P_s$ and $Q_s$ are given below:

| | |
|---|---|
| 7, 7 (p side: 7, q side: 7) | $f_i = 59 - i * 9$, can also be described as f = {59, 50, 41, 32, 23, 14, 5} <br> $g_i = 59 - i * 9$, can also be described as g = {59, 50, 41, 32, 23, 14, 5} <br> $Middle_{7,7} = (2 * (p_0 + q_0) + p_1 + q_1 + p_2 + q_2 + p_3 + q_3 + p_4 + q_4 + p_5 + q_5 + p_6 + q_6 + 8) >> 4$ <br> $P_7 = (p_6 + p_7 + 1) >> 1, Q_7 = (q_6 + q_7 + 1) >> 1$ |
| 7, 3 (p side: 7 q side: 3) | $f_i = 59 - i * 9$, can also be described as f = {59, 50, 41, 32, 23, 14, 5} <br> $g_i = 53 - i * 21$, can also be described as g = {53, 32, 11} <br> $Middle_{7,3} = (2 * (p_0 + q_0) + q_0 + 2 * (q_1 + q_2) + p_1 + q_1 + p_2 + p_3 + p_4 + p_5 + p_6 + 8) >> 4$ <br> $P_7 = (p_6 + p_7 + 1) >> 1, Q_3 = (q_2 + q_3 + 1) >> 1$ |
| 3, 7 (p side: 3 q side: 7) | $g_i = 59 - i * 9$, can also be described as g = {59, 50, 41, 32, 23, 14, 5} <br> $f_i = 53 - i * 21$, can also be described as f = {53, 32, 11} <br> $Middle_{3,7} = (2 * (q_0 + p_0) + p_0 + 2 * (p_1 + p_2) + q_1 + p_1 + q_2 + q_3 + q_4 + q_5 + q_6 + 8) >> 4$ <br> $Q_7 = (q_6 + q_7 + 1) >> 1, P_3 = (p_2 + p_3 + 1) >> 1$ |

Deblocking Control for Luma

The deblocking decision process is described in this sub-section.

Long luma filters are used only if all of the Condition1, Condition2 and Condition3 are TRUE.

The Condition1 is the "large block condition". This condition detects whether the samples at P-side and Q-side belong to large blocks, which are represented by the variable bSidePisLargeBlk and bSideQisLargeBlk respectively. The bSidePisLargeBlk and bSideQisLargeBlk are defined as follows.

bSidePisLargeBlk = ((edge type is vertical and $p_0$ belongs to CU with width >= 32) || (edge type is horizontal and $p_0$ belongs to CU with height >= 32))? TRUE: FALSE bSideQisLargeBlk = ((edge type is vertical and $q_0$ belongs to CU with width >= 32) || (edge type is horizontal and $q_0$ belongs to CU with height >= 32))? TRUE: FALSE Based on bSidePisLargeBlk and bSideQisLargeBlk, the condition 1 is defined as follows. Condition1=(bSidePisLargeBlk II bSidePisLargeBlk)?TRUE: FALSE.

Next, if Condition1 is true, the Condition2 will be further checked. First, the following variables are derived:

--- dp0, dp3, dq0, dq3 are first derived as in HEVC
if (p side is greater than or equal to 32)
    dp0 = ( dp0 + Abs( $p_{5,0}$ − 2 * $p_{4,0}$ + $p_{3,0}$ ) + 1 ) >> 1
    dp3 = ( dp3 + Abs( $p_{5,3}$ − 2 * $p_{4,3}$ + $p_{3,3}$ ) + 1 ) >> 1
if (q side is greater than or equal to 32)
    dq0 = ( dq0 + Abs( $q_{5,0}$ − 2 * $q_{4,0}$ + $q_{3,0}$ ) + 1 ) >> 1
    dq3 = ( dq3 + Abs( $q_{5,3}$ − 2 * $q_{4,3}$ + $q_{3,3}$ ) + 1 ) >> 1
dpq0, dpq3, dp, dq, d are then derived as in HEVC.

---

Then the condition 2 is defined as: Condition2=(d<β)? TRUE: FALSE.

Finally, if both the Condition1 and Condition2 are valid, the proposed deblocking method will check the Condition3 (the large block strong filter condition), which is defined as follows.

In the Condition3 StrongFilterCondition, the following variables are derived:

--- dpq is derived as in HEVC.
$sp_3$ = Abs( $p_3$ − $p_0$ ), derived as in HEVC
if (p side is greater than or equal to 32)
    $sp_3$ = ( $sp_3$ + Abs( $p_7$ − $p_3$ ) + 1 ) >> 1
$sq_3$ = Abs( $q_0$ − $q_3$ ), derived as in HEVC
if (q side is greater than or equal to 32)
    $sq_3$ = ( $sq_3$ + Abs( $q_7$ − $q_3$ ) + 1 ) >> 1
As in HEVC derive, StrongFilterCondition = (dpq is less than ( β >> 2 ), $sp_3$ + $sq_3$ is less than ( β >> 3 ), and Abs( $p_0$ − $q_0$ ) is less than ( 5 * $t_C$ + 1 ) >> 1) ? TRUE : FALSE

---

Long Deblocking Filter for Chroma

The following strong deblocking filter for chroma is defined:

---

$p_2'$ = (3*$p_3$+2*$p_2$+$p_1$+$p_0$+$q_0$+4) >> 3
$p_1'$ = (2*$p_3$+$p_2$+2*$p_1$+$p_0$+$q_0$+$q_1$+4) >> 3
$p_0'$ = ($p_3$+$p_2$+$p_1$+2*$p_0$+$q_0$+$q_1$+$q_2$+4) >> 3

---

The proposed chroma filter performs deblocking on a 4×4 chroma sample grid.

Deblocking Control for Chroma

The chroma strong filters are used on both sides of the block boundary. Here, the chroma filter is selected when both sides of the chroma edge are greater than or equal to 8 (chroma position), and the following decision with three conditions are satisfied: The first one is for decision of boundary strength as well as large block. The proposed filter can be applied when the block width or height which orthogonally crosses the block edge is equal to or larger than 8 in chroma sample domain. The second and third one are basically the same as for HEVC luma decision, which are on/off decision and strong filter decision, respectively. In the first decision, boundary strength (bS) is modified for chroma filtering as shown in Table 1. The condition in Table 1 are checked sequentially. If a condition is satisfied then the remaining conditions with lower priorities are skipped.

The Modified Boundary Strength

| Priority | Conditions | Y | U | V |
|---|---|---|---|---|
| 5 | At least one of the adjacent blocks is intra | 2 | 2 | 2 |
| 4 | At least one of the adjacent blocks has non-zero transform coefficients | 1 | 1 | 1 |
| 3 | Absolute difference between the motion vectors that belong to the adjacent blocks is greater than or equal to one integer luma sample | 1 | N/A | N/A |
| 2 | Motion prediction in the adjacent blocks refers to vectors is different | 1 | N/A | N/A |
| 1 | Otherwise | 0 | 0 | 0 |

Chroma deblocking is performed when bS is equal to 2, or bS is equal to 1 when a large block boundary is detected. The second and third condition is basically the same as HEVC luma strong filter decision as follows. In the second condition d is derived as in HEVC luma deblocking. The second condition will be TRUE when d is less than β. The test may include subsampling chroma gradient computation with threshold scaling as described in JVET-L0572. In the third condition StrongFilterCondition is derived as follows:

--- dpq is derived as in HEVC.
$sp_3$ = Abs( $p_3$ − $p_0$ ), derived as in HEVC
$sq_3$ = Abs( $q_0$ − $q_3$ ), derived as in HEVC
As in HEVC derive, StrongFilterCondition = (dpq is less than ( β >> 2 ), $sp_3$ + $sq_3$ is less than ( β >> 3 ), and Abs( $p_0$ − $q_0$ ) is less than ( 5 * $t_C$ + 1) >> 1)

Position Dependent Clipping

The proposal also introduces a position dependent clipping tcPD which is applied to the output samples of the luma filtering process involving strong and long filters that are modifying 7 and 3 samples at the boundary. Assuming quantization error distribution, it is proposed to increase clipping value for samples which are expected to have higher quantization noise, thus expected to have higher deviation of the reconstructed sample value from the true sample value.

For each P or Q boundary, depending on the result of a decision making process, position dependent threshold table is selected from Tc7 and Tc3 tables that are provided to decoder as a side information:

tcPD=(SP==3)?Tc3:Tc7;

tcQD=(SQ==3)?Tc3:Tc7;

Following this, filtered $p'_i$ and $q'_i$ sample values are clipped according to tcP and tcQ clipping values:

$p''_i$=clip3($p_i$+tcP$_i$,$p_i$−tcP$_i$,$p'_i$); and $q''_j$=clip3($q_j$+tcQ$_j$,$q_j$−tcQ$_j$,$q'_j$), where p'i and q'i are filtered sample values, p"i and q"j are output sample value after the clipping and tcPi tcPi are clipping thresholds that are derived from the VVC tc parameter and tcPD and tcQD. The function clip3(x,y,z) is a clipping function specified in VVC as:

$$\text{Clip3}(x, y, z) = \begin{cases} x & ; \quad z < x \\ y & ; \quad z > y \\ z & ; \quad \text{otherwise} \end{cases}.$$

CE11.1.7

The test makes use of the filtering and control processes of CE11.1.6. However, in this test the decoder would not access sample values beyond 6 and 3 CTU line buffers for luma and chroma, respectively. Filtering and control processes making use of samples at position beyond the CTU line buffers would be appropriately modified e.g. using padding/availability criteria/asymmetric filtering

CE11.1.8

The test makes use of the filtering and control processes of CE11.1.6. However, in this test the decoder would not access sample values beyond 4 and 2 CTU line buffers for luma and chroma, respectively. Filtering and control processes making use of samples at position beyond the CTU line buffers would be appropriately modified e.g. using padding/availability criteria/asymmetric filtering.

1.2 Another Long Filter Example of Long Filters JVET-L0072

Block boundary samples $p_i$ and $q_i$ for i=0 to S−1 are replaced by linear interpolation as follows:

$p_i'$=($f_i$*Middle$_s$+(64−$f_i$)*$P_s$+32)>>6, clipped to $p_i$±tc $q_i'$=($f_i$*Middle$_s$+(64−$f_i$)*$Q_s$+32)>>6, clipped to $q_i$±tc where f, Middle, P and Q are given below:

| S | Filter kernels |
|---|---|
| 7 | $f_i$ = 59 − i * 9, can also be described as f = {59, 50, 41, 32, 23, 14, 5}<br>Middle$_7$ = (2 * ($p_0$ + $q_0$) + $p_1$ + $q_1$ + $p_2$ + $q_2$ + $p_3$ + $q_3$ + $p_4$ + $q_4$ + $p_5$ + $q_5$ + $p_6$ + $q_6$ + 8) >> 4<br>$P_7$ = ($p_6$ + $p_7$ + 1) >> 1, $Q_7$ = ($q_6$ + $q_7$ + 1) >> 1 |
| 5 | $f_i$ = 58 − i * 13, can also be described as f = {58, 45, 32, 19, 6}<br>Middle$_5$ = (2 * ($p_0$ + $q_0$ + $p_1$ + $q_1$ + $p_2$ + $q_2$) + $p_3$ + $q_3$ + $p_4$ + $q_4$ + 8) >> 4<br>$P_5$ = ($p_4$ + $p_5$ + 1) >> 1, $Q_5$ = ($q_4$ + $q_5$ + 1) >> 1 |

FIG. 2B shows a horizontal boundary between two blocks.

FIG. 3B shows an example line buffer. As shown in FIG. 3 the line buffer consists of a set of rows from block P that are immediately adjacent to block Q (element 302 represents the horizontal block boundary between block P and block Q).

SUMMARY

Certain challenges currently exist. For example no asymmetric deblocking filter is defined for CE11.1.7 to handle max 6 CTU line buffers. Also, no asymmetric deblocking filter is defined for CE11.1.6 to CE11.1.8 to handle the interaction with deblocking with long filters and sub-block deblocking. This disclosure remedies these challenges.

In cases when it is needed to restrict the number of samples to modify on at least one side to 5 it can be useful to use the filter 5 sample filter from JVET-L0072 on that side and the 7 sample filter on the other side. Here follows three examples where this can be desired.

Example 1 (General Case)

In case the height of block P (Ph) is equal to 16 and the height of block Q (Qh) is equal to or larger than 32, the maximum number of samples to be modified on P side is 5 and the maximum number of samples to modify on Q side is Qh/2−1, but even though the maximum number of samples can be as large as Qh/2−1 (e.g., 15 when Qh=32), in some embodiments only 7 samples are modified because modifying 7 samples is sufficient in many cases.

Example 2 (6 CTU Line Buffer)

In case the horizontal boundary is aligned with the CTU boundary the number of samples to modify on the P side is restricted to 5. This reduces the number of line buffers to 6.

Example 3 (Interaction with Sub-Block in CU)

In case the horizontal boundary is aligned with a CU boundary where at least one of the CU's on P or Q side uses sub-block motion compensation, the number of samples to modify on the CU boundary on the side that uses sub-block motion compensation is restricted to 5. This enables filtering of at least two samples on the closest sub-block boundary. Same applies in case of a vertical boundary.

Example 4 (Special Case Due to Restrictions in Alternative 2 or 3)

Modify 5 samples on P side and 3 samples on Q side. P side can for example be restricted by alternative 2 or 3. Q side can be restricted by other conditions to use long filters. For example Q side is shorter than 32.

The asymmetric filters described herein enable deblocking with reduction in line buffers on CTU boundary and/or enables parallel deblocking of CU boundaries that is shared with at least one CU that uses sub-block motion compensation.

In one particular aspect there is provided an asymmetric deblocking method for deblocking a boundary between a P block of samples and a Q block of samples such that samples within the P block and samples within the Q block are modified. The method includes determining a value refP based on at least p5, wherein p5 is a sample within the P block and there are five other samples (p0, p1, p2, p3, and p4) within the P block that separate p5 from the boundary. The method also includes determining a value refQ based on at least qx, wherein qx is a sample within the P block and either i) there are three other samples (q0, q1, and q2) within the Q block that separate qx from the boundary or ii) there are seven other samples (q0, q1, q2, q3, q4, q5, and q6) within the Q block that separate qx from the boundary. The method further includes determining a value refMiddle based on at least p0 and q0, wherein p0 is directly adjacent to the boundary and q0 is directly adjacent to the boundary. The method also includes performing a linear interpolation between refP and refMiddle and performing a linear interpolation between refQ and refMiddle.

In one embodiment, the boundary is a vertical boundary, samples p0 to p5 are aligned in a row that is orthogonal to the vertical boundary, and samples q0 to q3 or samples q0 to q6 are aligned in the row.

In one embodiment, the boundary is a horizontal boundary, samples p0 to p5 are aligned in a column that is orthogonal to the horizontal boundary, and samples q0 to q3 or samples q0 to q6 are aligned in the column.

In one embodiment, there are seven other samples (q0, q1, q2, q3, q4, q5, and q6) within the Q block that separate qx from the boundary (i.e., qx=q7); refQ is equal to: (q6+qx+1)>>1, and refMiddle is equal to (p5+p4+p3+p2+2*(p1+p0+q0+q1)+q2+q3+q4+q5+8)>>4)

In one embodiment, performing the linear interpolation between refP and refMiddle comprises calculating p'(x)=(f(x)*refMiddle+(64−f(x))*refP+32)>>6, where x is 0 to 4, p'(x) is a filtered version of px, and f={58,45,32,19,6}.

In one embodiment, performing the linear interpolation between refQ and refMiddle comprises calculating q'(x)=(g(x)*refMiddle+(64−g(x))*refQ+32)>>6, where x is 0 to 6, q'(x) is a filtered version of qx, and g={59,50,41,32,23,14,5}.

In one embodiment, there are three other samples (q0, q1, and q2) within the Q block that separate qx from the boundary (i.e., qx=q3); refQ is equal to: (q2+qx+1)>>1, and refMiddle is equal to (p3+p2+p1+p0+q0+q1+q2+q3+4)>>3.

In one embodiment, performing the linear interpolation between refP and refMiddle comprises calculating calculating p'(x)=(f(x)*refMiddle+(64−f(x))*refP+32)>>6, where x is 0 to 4, p'(x) is a filtered version of px, and f={58,45,32,19,6}.

In one embodiment, performing the linear interpolation between refQ and refMiddle comprises calculating q'(x)=(g(x)*refMiddle+(64−g(x))*refQ+32)>>6, where x is 0 to 2, q'(x) is a filtered version of q(x), and g={53,32,11}.

In one embodiment, refP is equal to: (p5+p4+1)>>1.

In one embodiment, the P block is above or to the left of the Q block, or the P block is below or to the right of the Q block.

In one embodiment, the P block has a size in a direction orthogonal to the boundary of 32 samples, and the P block uses prediction sub-blocks.

In one embodiment, the Q block has a size in a direction orthogonal to the boundary of less than 32 samples.

In one embodiment, the Q block has a size in a direction orthogonal to the boundary of equal to or larger than 32 samples, and the Q block does not uses sub-blocks.

In one embodiment, the P block has a size in a direction orthogonal to the boundary of 32 samples, and the boundary is a horizontal coding tree unit (CTU) boundary.

In one embodiment, the process also includes, for x from 0 to 4, determining p"(x)=clip3(px+tcP$_x$, px−tcP$_x$, p'(x)), where tcP$_x$ is a clipping threshold, and $$\text{clip3}(x, y, z) = \begin{cases} x & ; \quad z < x \\ y & ; \quad z > y \\ z & ; \quad \text{otherwise} \end{cases}.$$

In one embodiment, the clipping threshold tcP$_x$ is a quantization parameter (QP) dependent clipping threshold.

In one embodiment, the process also includes, for x from 0 to 2, determining q"(x)=clip3(qx+tcQ$_x$, qx−tcQ$_x$, q'(x)), where tcQ$_x$ is a clipping threshold, and $$\text{clip3}(x, y, z) = \begin{cases} x & ; \quad z < x \\ y & ; \quad z > y \\ z & ; \quad \text{otherwise} \end{cases}.$$

In one embodiment, the clipping threshold tcQ$_x$ is a quantization parameter (QP) dependent clipping threshold.

In another aspect there is a computer program comprising instructions which when executed by processing circuitry causes the processing circuitry to perform any of the methods disclosed herein. In one embodiment there is a carrier that contains the computer program, wherein the carrier is one of an electronic signal, an optical signal, a radio signal, and a computer readable storage medium.

In another aspect there is an apparatus for deblocking a boundary between a P block of samples and a Q block of samples. The apparatus includes processing circuitry; and a memory. The memory contains instructions executable by said processing circuitry, whereby said apparatus is operative to: determine a value refP based on at least p5, wherein p5 is a sample within the P block and there are five other samples (p0, p1, p2, p3, and p4) within the P block that separate p5 from the boundary; determine a value refQ based on at least qx, wherein qx is a sample within the P block and either i) there are three other samples (q0, q1, and q2) within the Q block that separate qx from the boundary or ii) there are seven other samples (q0, q1, q2, q3, q4, q5, and q6) within the Q block that separate qx from the boundary; determine a value refMiddle based on at least p0 and q0, wherein p0 is directly adjacent to the boundary and q0 is directly adjacent to the boundary; perform a linear interpolation between refP and refMiddle; and perform a linear interpolation between refQ and refMiddle.

BRIEF DESCRIPTION OF THE DRAWINGS

The accompanying drawings, which are incorporated herein and form part of the specification, illustrate various embodiments.

DETAILED DESCRIPTION

Figure 4:
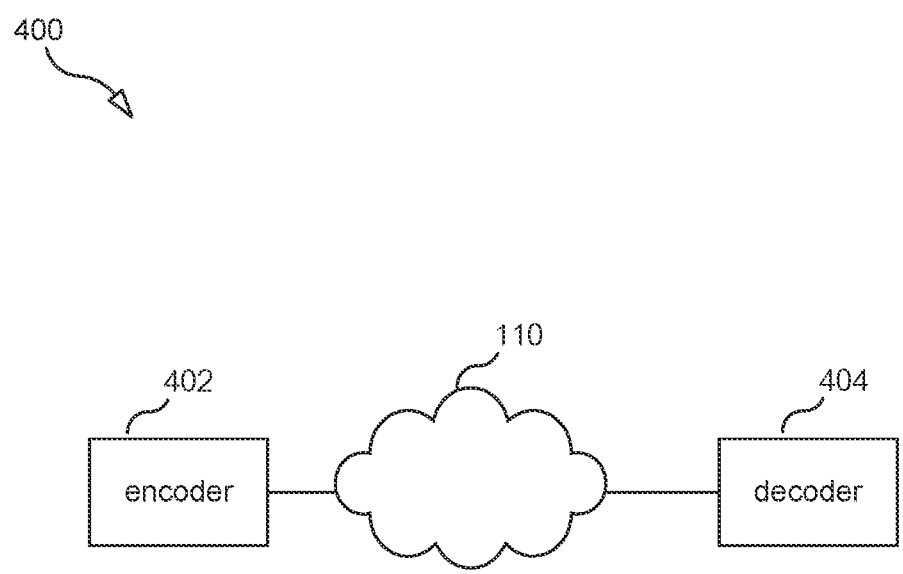
FIG. 4 illustrates a system comprising an encoder and a decoder.

FIG. 4 illustrates a system 400 according to an example embodiment. System 400 includes an encoder 402 in communication with a decoder 404 via a network 110 (e.g., the Internet or other network). Deblocking may be performed in both encoder 402 and decoder 404.

Figure 5:
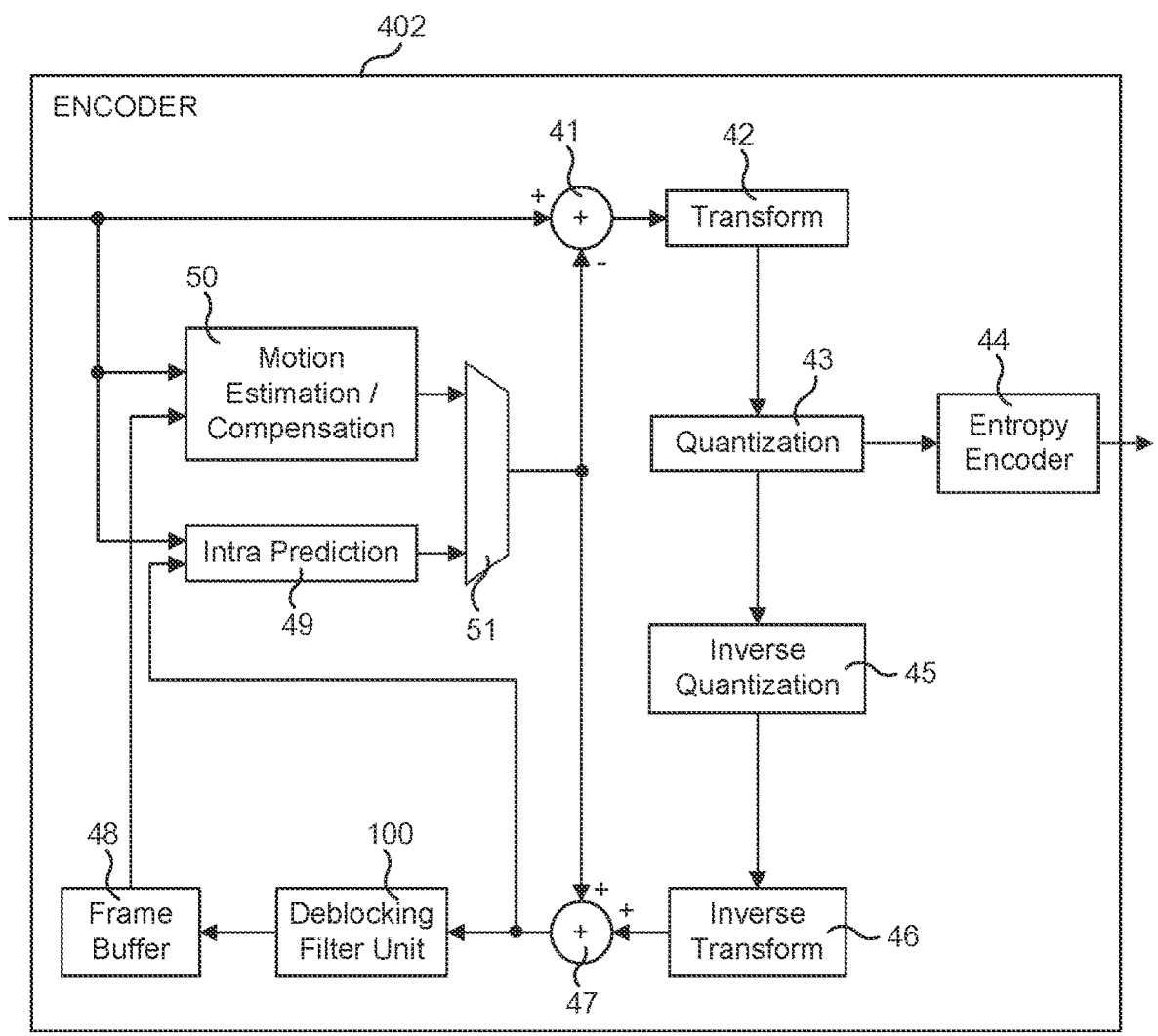
FIG. 5 illustrates an example encoder.

FIG. 5 is a schematic block diagram of encoder 402 for encoding a block of pixels in a video frame of a video sequence according to an embodiment. A current block of pixels is predicted by performing a motion estimation by a motion estimator 50 from an already provided block of pixels in the same frame or in a previous frame. The result of the motion estimation is a motion or displacement vector associated with the reference block, in the case of inter prediction. The motion vector is utilized by a motion compensator 50 for outputting an inter prediction of the block of pixels. An intra predictor 49 computes an intra prediction of the current block of pixels. The outputs from the motion estimator/compensator 50 and the intra predictor 49 are input in a selector 51 that either selects intra prediction or inter prediction for the current block of pixels. The output from the selector 51 is input to an error calculator in the form of an adder 41 that also receives the pixel values of the current block of pixels. The adder 41 calculates and outputs a residual error as the difference in pixel values between the block of pixels and its prediction. The error is transformed in a transformer 42, such as by a discrete cosine transform, and quantized by a quantizer 43 followed by coding in an encoder 44, such as by entropy encoder. In inter coding, also the estimated motion vector is brought to the encoder 44 for generating the coded representation of the current block of pixels. The transformed and quantized residual error for the current block of pixels is also provided to an inverse quantizer 45 and inverse transformer 46 to retrieve the original residual error. This error is added by an adder 47 to the block prediction output from the motion compensator 50 or the intra predictor 49 to create a reference block of pixels that can be used in the prediction and coding of a next block of pixels. This new reference block is first processed by a deblocking filter unit 100 according to the embodiments in order to perform deblocking filtering to combat any blocking artifact. The processed new reference block is then temporarily stored in a frame buffer 48, where it is available to the intra predictor 49 and the motion estimator/compensator 50.

Figure 6:
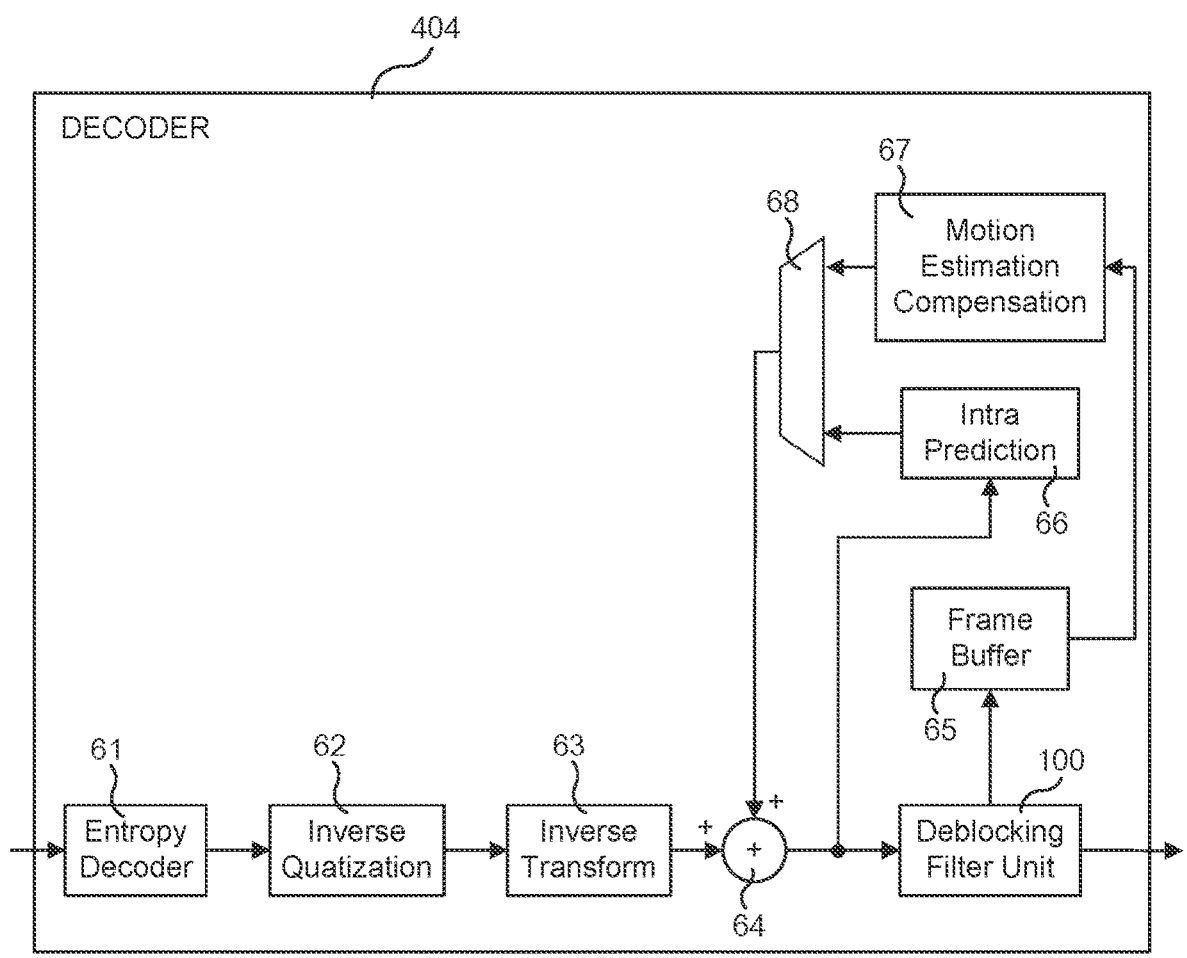
FIG. 6 illustrates an example decoder.

FIG. 6 is a corresponding schematic block diagram of decoder 402 according to some embodiments. The decoder 60 comprises a decoder 61, such as entropy decoder, for decoding an encoded representation of a block of pixels to get a set of quantized and transformed residual errors. These residual errors are dequantized in an inverse quantizer 62 and inverse transformed by an inverse transformer 63 to get a set of residual errors. These residual errors are added in an adder 64 to the pixel values of a reference block of pixels. The reference block is determined by a motion estimator/compensator 67 or intra predictor 66, depending on whether inter or intra prediction is performed. A selector 68 is thereby interconnected to the adder 64 and the motion estimator/compensator 67 and the intra predictor 66. The resulting decoded block of pixels output from the adder 64 is input to a deblocking filter unit 100 according to the embodiments in order to deblocking filter any blocking artifacts. The filtered block of pixels is output from the decoder 60 and is furthermore preferably temporarily provided to a frame buffer 65 and can be used as a reference block of pixels for a subsequent block of pixels to be decoded. The frame buffer 65 is thereby connected to the motion estimator/compensator 67 to make the stored blocks of pixels available to the motion estimator/compensator 67. The output from the adder 64 is preferably also input to the intra predictor 66 to be used as an unfiltered reference block of pixels.

Deblocking is performed at both the encoder and the decoder. This disclosure describes deblocking of horizontal boundaries where the P block is above the boundary and the Q block is below the boundary, but same can apply to vertical boundaries where the P side is the left side and the Q side is the right side of the boundary. The deblocking is mainly described for the case of 8×8 grid deblocking here but similar design could be used for 4×4 grid deblocking.

The deblocking is described on top of deblocking decisions in CE11.1.6/CE11.1.7 but those are merely examples, the embodiments disclosed herein could be used in combination with other decisions for deblocking as well.

Example 1 (Filter 5+7)

Consider that maxLengthP=5 is the maximum number of samples per column to modify on P side and that maxLengthQ=7 is the maximum number of samples per column to modify on Q side. Also, assume that a column of samples on the P side contains the following samples: p5 p4 p3 p2 p1 p0; and a column of samples on the P side contains the following samples: q0 q1 q2 q3 q4 q5 q6 q7, where samples p5 to p0 are in block P and samples q0 to q7 are in block Q where p0 is closest to block Q and q0 is closest to block P.

A deblocking filter can then be defined as:

refMiddle = (p5+p4+p3+p2+2*(p1+p0+q0+q1)+q2+q3+q4+q5 + 8) >> 4
refP= (p5+p4 +1)>>1
refQ = (q6+q7+1)>>1
p'(x) = (f(x)*refMiddle + (64-f(x))*refP + 32) >> 6
where x is 0 to 4, p'(x) is a filtered version of px, and f = {58,45,32,19,6} where f(0)=58, f(1)=45 etc.

-continued q'(x) = (g(x)*refMiddle + (64-g(x))*refQ + 32) >> 6
where x is 0 to 6, q'(x) is a filtered version of qx, and g = {59,50,41,32,23,14,5} where g(0)=59, g(1)=50 etc.

The filtered versions can then be clipped to not be further away from the value before filtering in horizontal direction than a value related to a QP dependent threshold tc.

In an alternative embodiment refMiddle is defined as: refMiddle=(p4+p3+2*(p2+p1+p0+q0)+q1+q2+q3+q4+q5+q6+8)>>4.

Example 2 (Filter 5+3)

Consider that maxLengthP=5 is the maximum number of samples per column to modify on P side and that maxLengthQ=3 is the maximum number of samples per column to modify on Q side. Also, assume that a column of samples on the P side contains the following samples: p5 p4 p3 p2 p1 p0; and a column of samples on the P side contains the following samples: q0 q1 q2 q3, where samples p5 to p0 are in block P and samples q0 to q3 are in block Q where p0 is closest to block Q and q0 is closest to block P. A deblocking filter can then be defined as:

refMiddle = (p3+p2+p1+p0+q0+q1+q2+q3+ 4) >> 3
refP= (p5+p4 +1)>>1
refQ = (q2+q3+1)>>1
p'(x) = (f(x)*refMiddle + (64-f(x))*refP + 32) >> 6
where x is 0 to 4, p'(x) is a filtered version of px, and f = {58,45,32,19,6} where f(0)=58, f(1)=45 etc.
q'(x) = (g(x)*refMiddle + (64-g(x))*refQ + 32) >> 6
where x is 0 to 2, q'(x) is a filtered version of q(x), and g = {53,32,11} where g(0)=53, g(1)=32 etc.

The filtered versions can then be clipped to not be further away from the value before filtering in horizontal direction than a value related to a QP dependent threshold tc.

In an alternative embodiment refMiddle is defined as: refMiddle=(q0+q1+2*(p2+p1+p0+q0+q1+q2)+p3+p4+8)>>4.

Example 3

The filter in Example 1 can be used to reduce the number of line buffers to 6 for a horizontal boundary which at least is aligned with the CTU boundary. As an example with Example 1 is below defined on top of CE11.1.7 to reduce the number of CTU line buffers to 6:

Asymmetric filtering for horizontal CTU boundary where both p side and q side are equal to or larger than 32.

| | |
|---|---|
| 5, 7 | $g_i = 59 - i * 9$, can also be described as g = {59, 50, 41, 32, 23, 14, 5} |
| (p side: 5 | $f_i = 58 - i * 13$, can also be described as f = {58, 45, 32, 19, 6} |
| q side: 7) | Middle5, 7 = $(2 * (q_0 + p_0 + p_1 + q_1) + q_2 + p_2 + q_3 + p_3 + q_4 + p_4 + q_5 + p_5 + 8) >> 4$ |
| | $Q_7 = (q_6 + q_7 + 1) >> 1$, $P_5 = (p_4 + p_5 + 1) >> 1$ |

In one embodiment in case size of side Q has already limited the filter length to 3 for block Q one alternative is then to use the filter in Example 2.

| | |
|---|---|
| 5, 3<br>(p side: 5<br>q side: 3) | $g_i = 53 - i * 21$, can also be described as $g = \{53, 32, 11\}$<br>$f_i = 58 - i * 13$, can also be described as $f = \{58, 45, 32, 19, 6\}$<br>Middle5,3 = $(q_0 + p_0 + p_1 + q_1 + q_2 + p_2 + q_3 + p_3 + 4) >> 3$<br>$Q_3 = (q_2 + q_3 + 1) >> 1$, $P_5 = (p_4 + p_5 + 1) >> 1$ |

In another embodiment in case size of side Q has already limited the filter length to 3 for block Q another alternative is not to use long filters in this case.

Example 4

The filter in Example 1 is used to limit the number of samples to modify to 5 on a side of a boundary between two large CUs or boundary between two large TUs (for example implicit TU) where sub-block motion compensation is used on at least one side.

Example embodiment on top of CE11.1.6:

Restriction of long filter to modify at most 5 samples on a side when that side uses sub-block motion compensation. This restriction can generate two new cases of asymmetric filtering; modification of 5 samples on one side and 7 samples on the other side and also modification of 5 samples on one side and 3 samples on the other side.

| | |
|---|---|
| 7, 5<br>(p side: 7<br>q side: 5) | $g_i = 58 - i * 13$, can also be described as $g = \{58, 45, 32, 19, 6\}$<br>$f_i = 59 - i * 9$, can also be described as $f = \{59, 50, 41, 32, 23, 14, 5\}$<br>Middle7,5 = $(2 * (p_0 + q_0 + p_1 + q_1) + q_2 + p_2 + q_3 + p_3 + q_4 + p_4 + q_5 + p_5 + 8) >> 4$<br>$Q_5 = (q_4 + q_5 + 1) >> 1$, $P_7 = (p_6 + p_7 + 1) >> 1$ |
| 5, 7<br>(p side: 5<br>q side: 7) | $g_i = 59 - i * 9$, can also be described as $g = \{59, 50, 41, 32, 23, 14, 5\}$<br>$f_i = 58 - i * 13$, can also be described as $f = \{58, 45, 32, 19, 6\}$<br>Middle5,7 = $(2 * (q_0 + p_0 + p_1 + q_1) + q_2 + p_2 + q_3 + p_3 + q_4 + p_4 + q_5 + p_5 + 8) >> 4$<br>$Q_7 = (q_6 + q_7 + 1) >> 1$, $P_5 = (p_4 + p_5 + 1) >> 1$ |
| 5, 5<br>(p side: 5<br>q side: 5) | $g_i = 58 - i * 13$, can also be described as $g = \{58, 45, 32, 19, 6\}$<br>$f_i = 58 - i * 13$, can also be described as $f = \{58, 45, 32, 19, 6\}$<br>Middle5,5 = $(2 * (q_0 + p_0 + p_1 + q_1 + q_2 + p_2) + q_3 + p_3 + q_4 + p_4 + 8) >> 4$<br>$Q_5 = (q_4 + q_5 + 1) >> 1$, $P_5 = (p_4 + p_5 + 1) >> 1$ |
| 5, 3<br>(p side: 5<br>q side: 3) | $g_i = 53 - i * 21$, can also be described as $g = \{53, 32, 11\}$<br>$f_i = 58 - i * 13$, can also be described as $f = \{58, 45, 32, 19, 6\}$<br>Middle5,3 = $(q_0 + p_0 + p_1 + q_1 + q_2 + p_2 + q_3 + p_3 + p_4) >> 3$<br>$Q_3 = (q_2 + q_3 + 1) >> 1$, $P_5 = (p_4 + p_5 + 1) >> 1$ |
| 3, 5<br>(p side: 3<br>q side: 5) | $g_i = 58 - i * 13$, can also be described as $g = \{58, 45, 32, 19, 6\}$<br>$f_i = 53 - i * 21$, can also be described as $f = \{53, 32, 11\}$<br>Middle3,5 = $(q_0 + p_0 + p_1 + q_1 + q_2 + p_2 + q_3 + p_3 + 4) >> 3$<br>$Q_5 = (q_4 + q_5 + 1) >> 1$, $P_3 = (p_2 + p_3 + 1) >> 1$ |

Alternative example embodiment on top of CE11.1.6:

Restriction of long filter to modify at most 5 samples on a side when that side uses sub-block motion compensation. In case the restriction results in a case of 3 samples on one side and 5 samples on the other side long filters are not used.

| | |
|---|---|
| 7, 5<br>(p side: 7<br>q side: 5) | $g_i = 58 - i * 13$, can also be described as $g = \{58, 45, 32, 19, 6\}$<br>$f_i = 59 - i * 9$, can also be described as $f = \{59, 50, 41, 32, 23, 14, 5\}$<br>Middle7,5 = $(2 * (p_0 + q_0 + p_1 + q_1) + q_2 + p_2 + q_3 + p_3 + q_4 + p_4 + q_5 + p_5 + 8) >> 4$<br>$Q_5 = (q_4 + q_5 + 1) >> 1$, $P_7 = (p_6 + p_7 + 1) >> 1$ |
| 5, 7<br>(p side: 5<br>q side: 7) | $g_i = 59 - i * 9$, can also be described as $g = \{59, 50, 41, 32, 23, 14, 5\}$<br>$f_i = 58 - i * 13$, can also be described as $f = \{58, 45, 32, 19, 6\}$<br>Middle5,7 = $(2 * (p_0 + q_0 + p_1 + q_1) + q_2 + p_2 + q_3 + p_3 + q_4 + p_4 + q_5 + p_5 + 8) >> 4$<br>$Q_7 = (q_6 + q_7 + 1) >> 1$, $P_5 = (p_4 + p_5 + 1) >> 1$ |
| 5, 5<br>(p side: 5<br>q side: 5) | $g_i = 58 - i * 13$, can also be described as $g = \{58, 45, 32, 19, 6\}$<br>$f_i = 58 - i * 13$, can also be described as $f = \{58, 45, 32, 19, 6\}$<br>Middle5,5 = $(2 * (q_0 + p_0 + p_1 + q_1 + q_2 + p_2) + q_3 + p_3 + q_4 + p_4 + 8) >> 4$<br>$Q_5 = (q_4 + q_5 + 1) >> 1$, $P_5 = (p_4 + p_5 + 1) >> 1$ |

Example 5

In this embodiment the decision for the side where number of samples to be modified is restricted to 5 (maxLengthP==5 or maxLengthQ==5) is also restricted so that it at most uses one more sample further away from the block boundary than what is modified.

Example embodiment of this on top of CE11.1.6 or CE11.1.7 where the decision for the side where number of samples to be modified is restricted 5 is also restricted (condition 3 in Deblocking control for luma in CE11.1.6/CE11.1.7):

```
if (p side is greater than or equal to 32)
{
   If(maxLengthP==5)
      sp3 = ( sp3 + Abs( p5 − p3 ) + 1) >> 1
   else
      sp3 = ( sp3 + Abs( p7 − p3 ) + 1) >> 1
}
if (q side is greater than or equal to 32)
{
   If(maxLengthQ==5)
      sq3 = ( sq3 + Abs( q5 − q3 ) + 1) >> 1
   else
      sq3 = ( sq3 + Abs( q7 − q3 ) + 1) >> 1
}
```

Example 6

In this embodiment, long filters are defined to be used if at least one side is equal to or larger than 32 and the other side is equal to or larger than 16. If one side is equal to or larger than 32, then limit the number of samples to filter to 7 otherwise if one side is equal to or larger than 16 limit the number of samples to filter to 5 otherwise no filtering with long filters.

Example embodiment of this on top of CE11.1.6 the asymmetric filtering with filtering of 3 samples on one side and 7 samples on the other side as in CE11.1.6 is replaced with filtering of 5 samples on one side and 7 samples on the other side. At the same time a restriction of the size of both sides of the boundary is included.

Long Deblocking Filter for Luma

The proposal uses a bilinear filter when samples at either one side of a boundary belong to a large block. A sample belonging to a large block is defined as when the width $\geq$=32 for a vertical edge, and when height$>$=32 for a horizontal edge, and the adjacent block need to be equal to or larger than 16. The bilinear filter is listed below.

Block boundary samples $p_i$ and $q_i$ for i=0 to S−1 are replaced by linear interpolation as follows:

$$p_i' = (f_i * Middle_{s,t} + (64-f_i)*P_s + 32) >> 6), \text{clipped to } p_i \pm tcPD_i$$

$$q_i' = (g_i * Middle_{s,t} + (64-g_i)*Q_s + 32) >> 6), \text{clipped to } q_i \pm tcPD_i,$$

where $tcPD_i$ term is a position dependent clipping and $f_i$, $Middle_{s,t}$, $P_s$ and $Q_s$ are given below:

| | |
|---|---|
| 7, 7 (p side: 7, q side: 7) | $f_i = 59 - i * 9$, can also be described as f = {59, 50, 41, 32, 23, 14, 5}<br>$g_i = 59 - i * 9$, can also be described as g = {59, 50, 41, 32, 23, 14, 5}<br>$Middle_{7,7} = (2 * (p_0 + q_0) + p_1 + q_1 + p_2 + q_2 + p_3 + q_3 + p_4 + q_4 + p_5 + q_5 + p_6 + q_6 + 8) >> 4$<br>$P_7 = (p_6 + p_7 + 1) >> 1$, $Q_7 = (q_6 + q_7 + 1) >> 1$ |
| 7, 5 (p side: 7 q side: 5) | $g_i = 58 - i * 13$, can also be described as g = {58, 45, 32, 19, 6}<br>$f_i = 59 - i * 9$, can also be described as f = {59, 50, 41, 32, 23, 14, 5}<br>$Middle_{7,5} = (2 * (p_0 + q_0 + p_1 + q_1) + q_2 + p_2 + q_3 + p_3 + q_4 + p_4 + q_5 + p_5 + 8) >> 4$<br>$Q_5 = (q_4 + q_5 + 1) >> 1$, $P_7 = (p_6 + p_7 + 1) >> 1$ |
| 5, 7 (p side: 5 q side: 7) | $g_i = 59 - i * 9$, can also be described as g = {59, 50, 41, 32, 23, 14, 5}<br>$f_i = 58 - i * 13$, can also be described as f = {58, 45, 32, 19, 6}<br>$Middle_{5,7} = (2 * (q_0 + p_0 + p_1 + q_1) + q_2 + p_2 + q_3 + p_3 + q_4 + p_4 + q_5 + p_5 + 8) >> 4$<br>$Q_7 = (q_6 + q_7 + 1) >> 1$, $P_5 = (p_4 + p_5 + 1) >> 1$ |

Deblocking Control for Luma

The deblocking decision process is described in this sub-section. Long luma filters are used only if all of the Condition1, Condition2 and Condition3 are TRUE.

The Condition1 is the "large block condition." This condition detects whether the samples at P-side and Q-side belong to large blocks, which are represented by the variable bSidePisLargeBlk and bSideQisLargeBlk respectively. The bSidePisLargeBlk and bSideQisLargeBlk are defined as follows:

bSidePisLargeBlk = ((edge type is vertical and $p_0$ belongs to CU with width >= 32) || (edge type is horizontal and $p_0$ belongs to CU with height >= 32))? TRUE: FALSE bSideQisLargeBlk = ((edge type is vertical and $q_0$ belongs to CU with width >= 32) || (edge type is horizontal and $q_0$ belongs to CU with height >= 32))? TRUE: FALSE Based on bSidePisLargeBlk and bSideQisLargeBlk, the condition 1A is defined as follows: Condition1A=(bSidePisLargeBlk || bSidePisLargeBlk)?TRUE: FALSE.

Next, if Condition1A is true, bSidePisNearLargeBlk and bSideQisNearLargeBlk will also be checked. The bSidePisNearLargeBlk and bSideQisNearLargeBlk are defined as follows:

```
bSidePisNearLargeBlk = ((edge type is vertical and p_0 belongs to CU with width >= 16) || (edge
type is horizontal and p_0 belongs to CU with height >= 16))? TRUE: FALSE
bSideQisNearLargeBlk = ((edge type is vertical and q_0 belongs to CU with width >= 16) || (edge
type is horizontal and q_0 belongs to CU with height >= 16))? TRUE: FALSE
```

Condition1=Condition1A && ((!bSidePisLargeBlk && bSidePisNearLargeBlk)||(!bSideQisLargeBlk && bSideQisNearLargeBlk))?TRUE:FALSE.

Next, if Condition1 is true, the Condition2 will be further checked. First, the following variables are derived:

```
dp0, dp3, dq0, dq3 are first derived as in HEVC
if (p side is greater than or equal to 16)
    dp0 = ( dp0 + Abs( p_{5,0} - 2 * p_{4,0} + p_{3,0} ) + 1 ) >> 1
    dp3 = ( dp3 + Abs( p_{5,3} - 2 * p_{4,3} + p_{3,3} ) + 1 ) >> 1
if (q side is greater than or equal to 16)
    dq0 = ( dq0 + Abs( q_{5,0} - 2 * q_{4,0} + q_{3,0} ) + 1 ) >> 1
    dq3 = ( dq3 + Abs( q_{5,3} - 2 * q_{4,3} + q_{3,3} ) + 1 ) >> 1
dpq0, dpq3, dp, dq, d are then derived as in HEVC.
```

Then the condition 2 is defined as follows: Condition2=(d<β)?TRUE: FALSE.

Finally, if both the Condition1 and Condition2 are valid, the proposed deblocking method will check the Condition3 (the large block strong filter condition), which is defined as follows. In the Condition3 StrongFilterCondition, the following variables are derived:

```
dpq is derived as in HEVC.
sp_3 = Abs( p_3 - p_0 ), derived as in HEVC
if (p side is greater than or equal to 32)
    sp_3 = ( sp_3 + Abs( p_7 - p_3 ) + 1 ) >> 1
else
    sp_3 = ( sp_3 + Abs( p_5 - p_3 ) + 1 ) >> 1
sq_3 = Abs( q_0 - q_3 ), derived as in HEVC
if (q side is greater than or equal to 32)
    sq_3 = ( sq_3 + Abs( q_7 - q_3 ) + 1 ) >> 1
else
    sq_3 = ( sq_3 + Abs( q_5 - q_3 ) + 1 ) >> 1
```

As in HEVC derive, StrongFilterCondition=(dpq is less than (β>>2), $sp_3+sq_3$ is less than (β>>3), and $Abs(p_0-q_0)$ is less than $(5*t_C+1)>>1$)?TRUE: FALSE.

If condition 3 is true, the number of samples to modify on each side is derived as:

```
S_P = ((!bSidePisLargeBlk && bSidePisNearLargeBlk) ? 5:7; and
S_Q = ((!bSideQisLargeBlk && bSideQisNearLargeBlk) ? 5:7
```

Example 7

Example 7 is like Example 6 but with a restriction on the number of samples to modify on the P side to 5 for a horizontal boundary that is aligned with the CTU boundary. Example embodiment on top of CE11.1.7 is to also do same restriction of decisions as in Example 5.

Example 8

Example 8 is like Example 6 but with additional restriction to limit the number of samples to modify to 5 on a side of a boundary between two large CUs or boundary between two large TUs (for example implicit TU) where sub-block motion compensation is used on at least one side.

For a CU boundary or implicit TU boundary, maxLengthP is set to 5 if sub-block motion compensation is used in block P otherwise it is 7; and maxLengthQ is set to 5 if sub-block motion compensation is used in block Q otherwise it is 7. If both sides uses sub-blocks this requires one additional filter to cover this case.

Additional filter for the case of maxLengthP=5 and maxLengthQ=5:

| | |
|---|---|
| 5, 5 | $g_i = 58 - i * 13$, can also be described as g = |
| (p side: 5 | {58, 45, 32, 19, 6} |
| q side: 5) | $f_i = 58 - i * 13$, can also be described as f = |
| | {58, 45, 32, 19, 6} |
| | Middle5,5 = $(2 * (q_0 + p_0 + p_1 + q_1 + q_2 + p_2) +$ |
| | $q_3 + p_3 + q_4 + p_4 + 8) >> 4$ |
| | $Q_5 = (q_4 + q_5 + 1) >> 1, P_5 = (p_4 + p_5 + 1) >> 1$ |

In this embodiment, condition 3 in Example 6 is modified, such that:

```
if (p side is greater than or equal to 32)
{
    If(maxLengthP==5)
        sp_3 = ( sp_3 + Abs( p_5 - p_3 ) + 1 ) >> 1
    else
        sp_3 = ( sp_3 + Abs( p_7 - p_3 ) + 1 ) >> 1
}
else
    sp_3 = ( sp_3 + Abs( p_5 - p_3 ) + 1 ) >> 1
if (q side is greater than or equal to 32)
{
    If(maxLengthQ==5)
        sq_3 = ( sq_3 + Abs( q_5 - q_3 ) + 1 ) >> 1
    else
        sq_3 = ( sq_3 + Abs( q_7 - q_3 ) + 1 ) >> 1
}
else
    sq_3 = ( sq_3 + Abs( q_5 - q_3 ) + 1 ) >> 1
```

Figure 7:
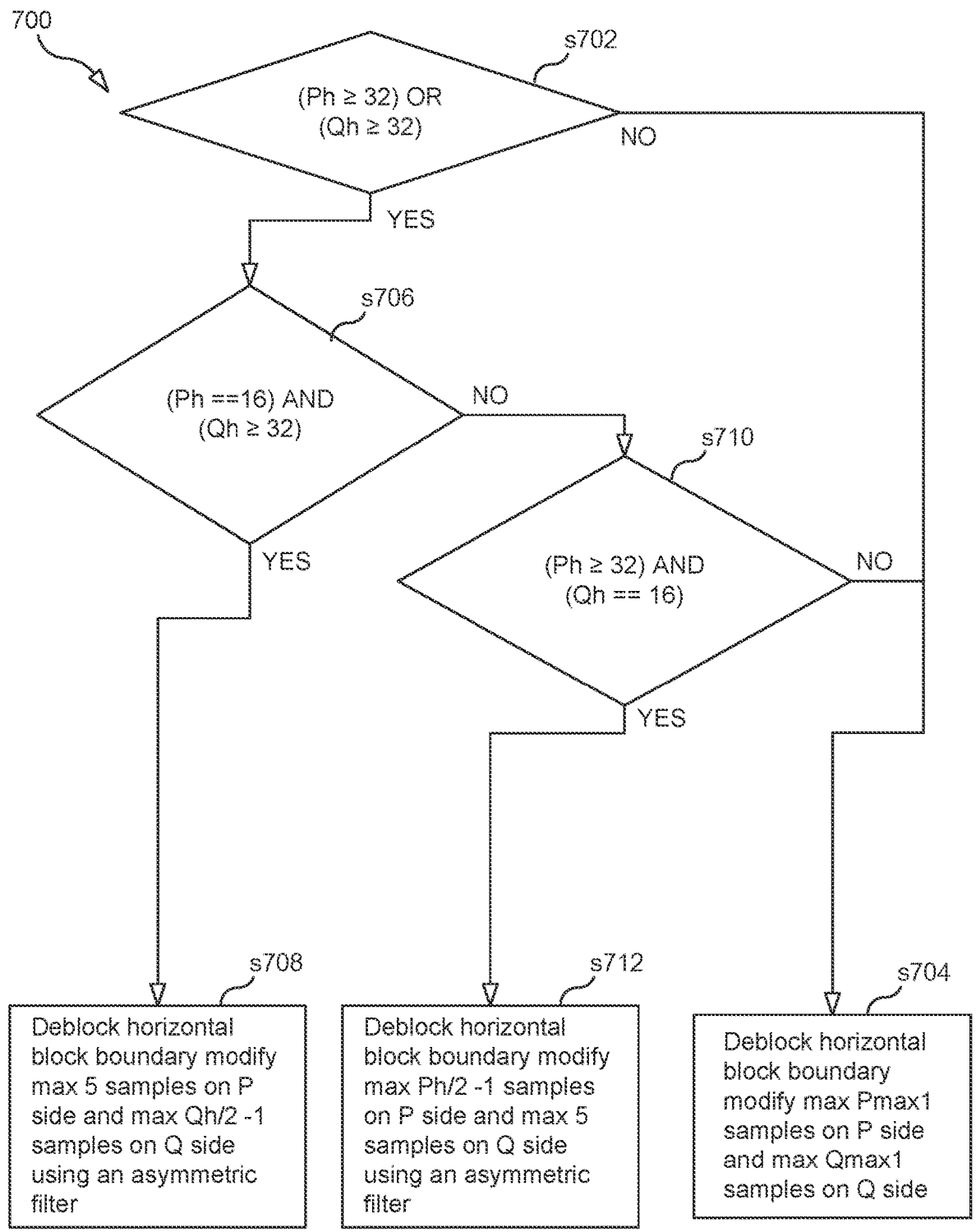
FIG. 7 is a flow chart illustrating a process according to an embodiment.

FIG. 7 is a flow chart illustrating a deblocking process 700, according to an embodiment, for deblocking a horizontal boundary between a first block of samples (denoted block "P") and a second block of samples (denoted block "Q"). Process 700 may begin in step s702.

Step s702 comprises determining whether a first condition is true, wherein the first condition is true if Ph is greater than or equal to 32 or Qh is great than or equal to 32, where Ph is the height of block P and Qh is the height of block Q. If the first condition is not true, then process 700 proceeds to step s704, otherwise the process proceeds to step s706.

Step s704 comprises deblocking the horizontal block boundary with the following restrictions: i) the maximum number of samples per column on the P side that are modified by the deblocking is Pmax1, where Pmax1 is equal to max(3,Ph/2-1) for deblocking on 8×8 grid and Pmax1 is equal to Ph/2-1 for deblocking on an 4×4 grid and ii) the maximum number of samples per column on the Q side that are modified by the deblocking is Qmax1, where Qmax1 is equal to max(3,Qh/2-1) for deblocking on 8×8 grid and Qmax1 is equal to Qh/2-1 for deblocking on an 4×4 grid. Even though the maximum number of samples can be as large as Qh/2-1 (e.g., 15 when Qh=32), and Ph/2-1 (e.g., 15 when Ph=32) in some embodiments only 7 samples are modified because modifying 7 samples is sufficient in many cases.

Step s706 comprises determining whether a second condition is true, where the second condition is true if Ph equals 16 and Qh is greater than or equal to 32. If the second condition is true, then the process goes to step s708, other the process goes to step s710.

Step s708 comprises deblocking the horizontal block boundary with the following restrictions: i) the maximum number of samples per column on the P side that are modified by the deblocking is 5 and ii) the maximum number of samples per column on the Q side that are modified by the deblocking is Qh/2-1. Even though the maximum number of samples can be as large as Qh/2-1 (e.g., 15 when Qh=32) in some embodiments only 7 samples are modified because modifying 7 samples is sufficient in many cases.

Step s710 comprises determining whether a third condition is true, where the third condition is true if Qh equals 16 and Ph is greater than or equal to 32. If the third condition is true, then the process goes to step s712, other the process goes to step s704.

Step s712 comprises deblocking the horizontal block boundary with the following restrictions: i) the maximum number of samples per column on the Q side that are modified by the deblocking is 5 and ii) the maximum number of samples per column on the P side that are modified by the deblocking is Ph/2-1. Even though the maximum number of samples can be as large as Ph/2-1 (e.g., 15 when Ph=32) in some embodiments only 7 samples are modified because modifying 7 samples is sufficient in many cases.

Figure 8:
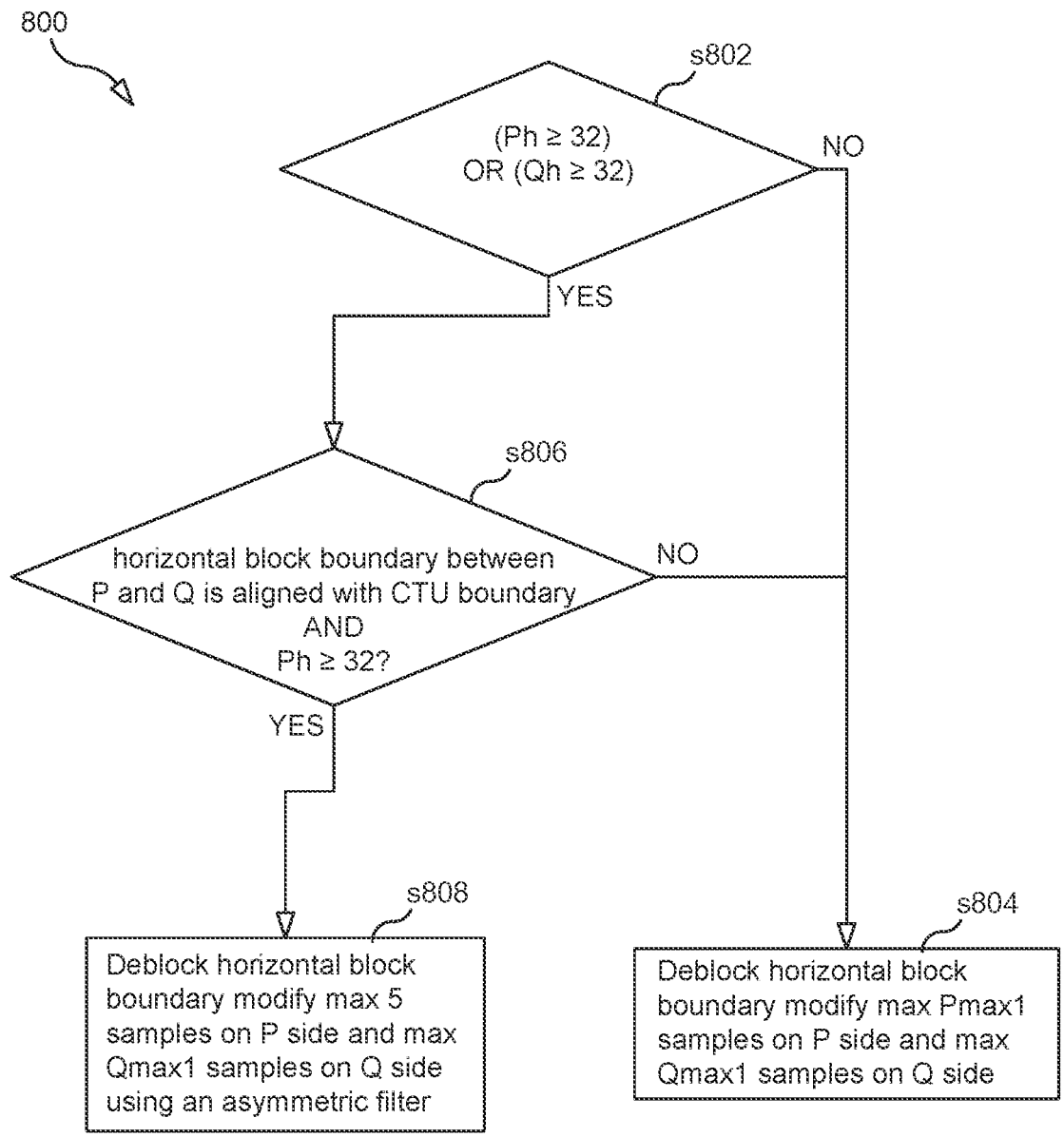
FIG. 8 is a flow chart illustrating a process according to an embodiment.

FIG. 8 is a flow chart illustrating a deblocking process 800, according to an embodiment, for deblocking a horizontal boundary between a first block of samples (denoted block "P") and a second block of samples (denoted block "Q"). Process 800 may begin in step s802.

Step s802 comprises determining whether a first condition is true, wherein the first condition is true if Ph is greater than or equal to 32 or Qh is great than or equal to 32, where Ph is the height of block P and Qh is the height of block Q. If the first condition is not true, then process 800 proceeds to step s804, otherwise the process proceeds to step s806.

Step s804 comprises deblocking the horizontal block boundary with the following restrictions: i) the maximum number of samples per column on the P side that are modified by the deblocking is Pmax1 where Pmax1 is equal to max(3,Ph/2-1) for deblocking on 8×8 grid and Pmax1 is equal to Ph/2-1 for deblocking on an 4×4 grid and ii) the maximum number of samples per column on the Q side that are modified by the deblocking is Qmax1 where Qmax1 is equal to max(3,Qh/2-1) for deblocking on 8×8 grid and Qmax1 is equal to Qh/2-1 for deblocking on an 4×4 grid. Even though the maximum number of samples Qmax1 can be as large as Qh/2-1 (e.g., 15 when Qh=32), and Pmax can be as large as Ph/2-1 (e.g., 15 when Ph=32) in some embodiments only 7 samples are modified because modifying 7 samples is sufficient in many cases.

Step s806 comprises determining whether a second condition is true, where the second condition is true if the horizontal block boundary is aligned with a coding tree unit (CTU) boundary and Ph is greater than or equal to 32. If the second condition is true, then the process goes to step s808, other the process goes to step s804.

Step s808 comprises deblocking the horizontal block boundary with the following restrictions: i) the maximum number of samples per column on the P side that are modified by the deblocking is 5 and ii) the maximum number of samples per column on the Q side that are modified by the deblocking is Qmax1 where Qmax1 is equal to max(3,Qh/2-1) for deblocking on 8×8 grid and Qmax1 is equal to Qh/2-1 for deblocking on an 4×4 grid. Even though the maximum number of samples Qmax1 can be as large as Qh/2-1 (e.g., 15 when Qh=32) in some embodiments only 7 samples are modified because modifying 7 samples is sufficient in many cases.

Figure 9:
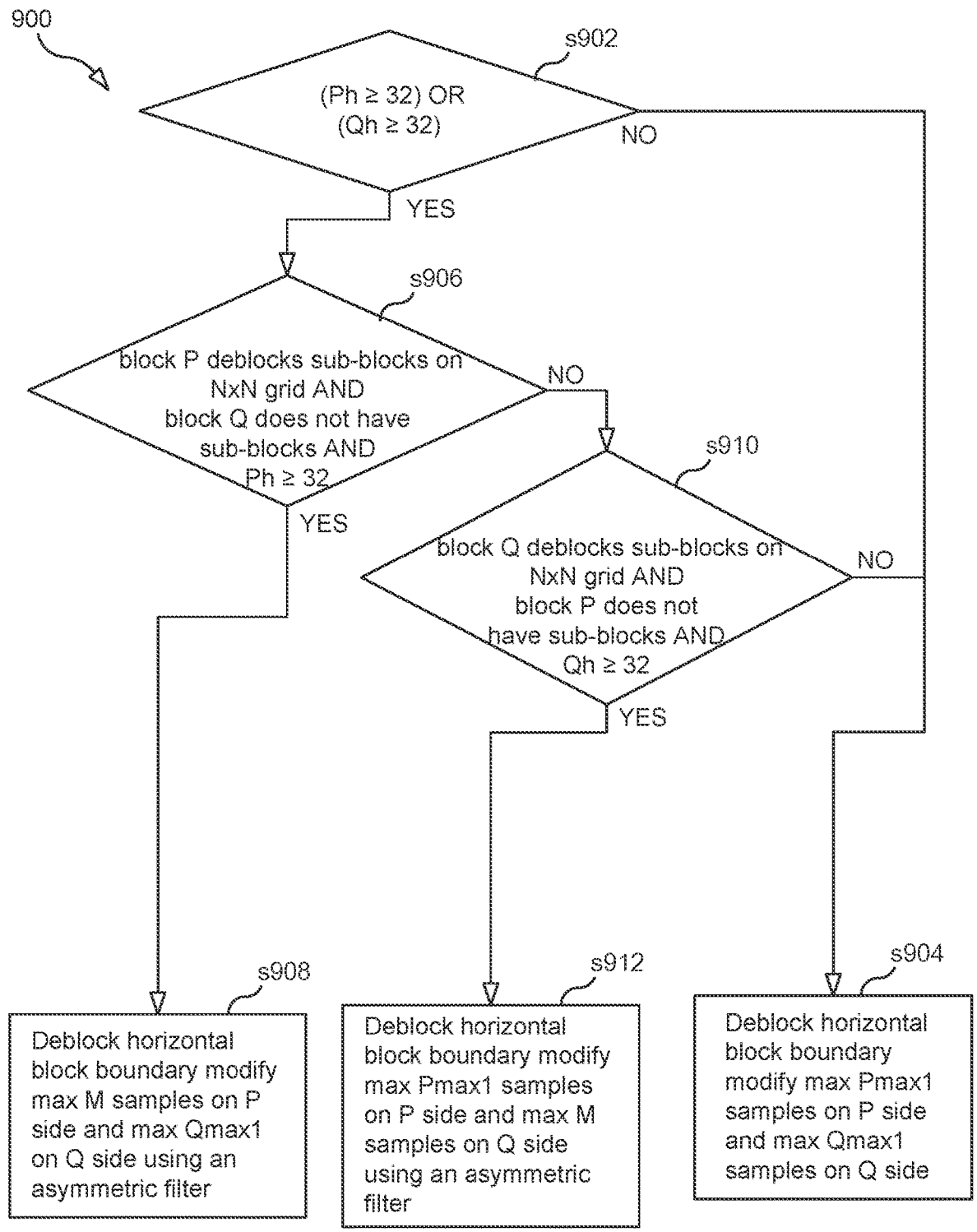
FIG. 9 is a flow chart illustrating a process according to an embodiment.

FIG. 9 is a flow chart illustrating a deblocking process 900, according to an embodiment, for deblocking a horizontal boundary between a first block of samples (denoted block "P") and a second block of samples (denoted block "Q"). Process 900 may begin in step s902.

Step s902 comprises determining whether a first condition is true, wherein the first condition is true if Ph is greater than or equal to 32 or Qh is great than or equal to 32, where Ph is the height of block P and Qh is the height of block Q. If the first condition is not true, then process 900 proceeds to step s904, otherwise the process proceeds to step s906.

Step s904 comprises deblocking the horizontal block boundary with the following restrictions: i) the maximum number of samples per column on the P side that are modified by the deblocking is Pmax1, where Pmax1 is equal to max(3,Ph/2-1) for deblocking on 8×8 grid and Pmax1 is equal to Ph/2-1 for deblocking on an 4×4 grid and ii) the maximum number of samples per column on the Q side that are modified by the deblocking is Qmax1, where Qmax1 is equal to max(3,Qh/2-1) for deblocking on 8×8 grid and Qmax1 is equal to Qh/2-1 for deblocking on an 4×4 grid. Even though the maximum number of samples Qmax1 can be as large as Qh/2-1 (e.g., 15 when Qh=32), and Pmax can be as large as Ph/2-1 (e.g., 15 when Ph=32) in some embodiments only 7 samples are modified because modifying 7 samples is sufficient in many cases.

Step s906 comprises determining whether a second condition is true, where the second condition is true if block P deblocks sub-blocks on an N×N grid and block Q does not have sub-blocks and Ph is greater than or equal to 32. If the second condition is true, then the process goes to step s908, other the process goes to step s910.

Step s908 comprises deblocking the horizontal block boundary with the following restrictions: i) the maximum number of samples per column on the P side that are modified by the deblocking is M and ii) the maximum number of samples per column on the Q side that are modified by the deblocking is Qmax1 where Qmax1 is equal to max(3,Qh/2-1) for deblocking on 8×8 grid and Qmax1 is equal to Qh/2-1 for deblocking on an 4×4 grid. Where M is equal to 1 when N is equal to 4 and M is equal to 5 when N is 8. Even though the maximum number of samples Qmax1 can be as large as Qh/2-1 (e.g., 15 when Qh=32) in some embodiments only 7 samples are modified because modifying 7 samples is sufficient in many cases.

Step s910 comprises determining whether a third condition is true, where the third condition is true if block Q deblocks sub-blocks on an N×N grid and block P does not have sub-blocks and Qh is greater than or equal to 32. If the third condition is true, then the process goes to step s912, other the process goes to step s904.

Step s912 comprises deblocking the horizontal block boundary with the following restrictions: i) the maximum number of samples per column on the Q side that are modified by the deblocking is M and ii) the maximum number of samples per column on the P side that are modified by the deblocking is Pmax1 where Pmax1 is equal to max(3,Ph/2-1) for deblocking on 8×8 grid and Pmax1 is equal to Ph/2-1 for deblocking on an 4×4 grid. Where M is equal to 1 when N is equal to 4 and M is equal to 5 when N is 8. Even though the maximum number of samples Pmax can be as large as Ph/2-1 (e.g., 15 when Ph=32) in some embodiments only 7 samples are modified because modifying 7 samples is sufficient in many cases.

Figure 10:
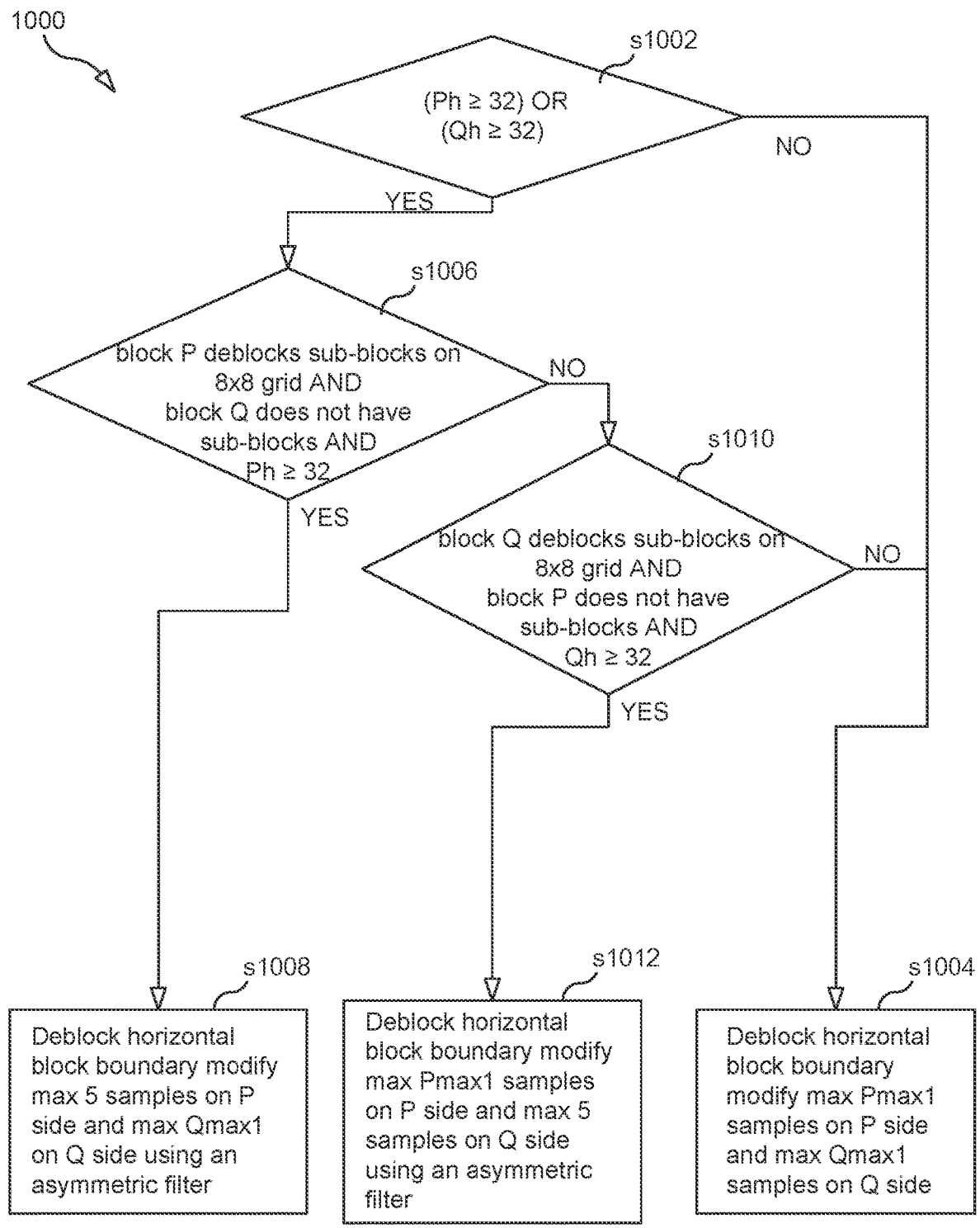
FIG. 10 is a flow chart illustrating a process according to an embodiment.

FIG. 10 is a flow chart illustrating a deblocking process 1000, according to an embodiment, for deblocking a horizontal boundary between a first block of samples (denoted block "P") and a second block of samples (denoted block "Q"). Process 1000 may begin in step s1002.

Step s1002 comprises determining whether a first condition is true, wherein the first condition is true if Ph is greater than or equal to 32 or Qh is great than or equal to 32, where Ph is the height of block P and Qh is the height of block Q. If the first condition is not true, then process 1000 proceeds to step s1004, otherwise the process proceeds to step s1006.

Step s1004 comprises deblocking the horizontal block boundary with the following restrictions: i) the maximum number of samples per column on the P side that are modified by the deblocking is Pmax1, where Pmax1 is equal to max(3,Ph/2-1) for deblocking on 8×8 grid and Pmax1 is equal to Ph/2-1 for deblocking on an 4×4 grid and ii) the maximum number of samples per column on the Q side that are modified by the deblocking is Qmax1, where Qmax1 is equal to max(3,Qh/2-1) for deblocking on 8×8 grid and Qmax1 is equal to Qh/2-1 for deblocking on an 4×4 grid. Even though the maximum number of samples Qmax1 can be as large as Qh/2-1 (e.g., 15 when Qh=32), and Pmax can be as large as Ph/2-1 (e.g., 15 when Ph=32) in some embodiments only 7 samples are modified because modifying 7 samples is sufficient in many cases.

Step s1006 comprises determining whether a second condition is true, where the second condition is true if block P deblocks sub-blocks on 8×8 grid and block Q does not have sub-blocks and Ph is greater than or equal to 32. If the second condition is true, then the process goes to step s1008, other the process goes to step s1010.

Step s1008 comprises deblocking the horizontal block boundary with the following restrictions: i) the maximum number of samples per column on the P side that are modified by the deblocking is 5 and ii) the maximum number of samples per column on the Q side that are modified by the deblocking is Qmax1 where Qmax1 is equal to max(3,Qh/2-1) for deblocking on 8×8 grid and Qmax1 is equal to Qh/2-1 for deblocking on an 4×4 grid. Even though the maximum number of samples Qmax1 can be as large as Qh/2-1 (e.g., 15 when Qh=32) in some embodiments only 7 samples are modified because modifying 7 samples is sufficient in many cases.

Step s1010 comprises determining whether a third condition is true, where the third condition is true if block Q deblocks sub-blocks on 8×8 grid and block P does not have sub-blocks and Qh is greater than or equal to 32. If the third condition is true, then the process goes to step s1012, other the process goes to step s1004.

Step s1012 comprises deblocking the horizontal block boundary with the following restrictions: i) the maximum number of samples per column on the P side that are modified by the deblocking is Pmax1 where Pmax1 is equal to max(3,Ph/2-1) for deblocking on 8×8 grid and Pmax1 is equal to Ph/2-1 for deblocking on an 4×4 grid and ii) the maximum number of samples per column on the Q side that are modified by the deblocking is 5. Even though the maximum number of samples Pmax can be as large as Ph/2-1 (e.g., 15 when Ph=32) in some embodiments only 7 samples are modified because modifying 7 samples is sufficient in many cases.

Figure 11:
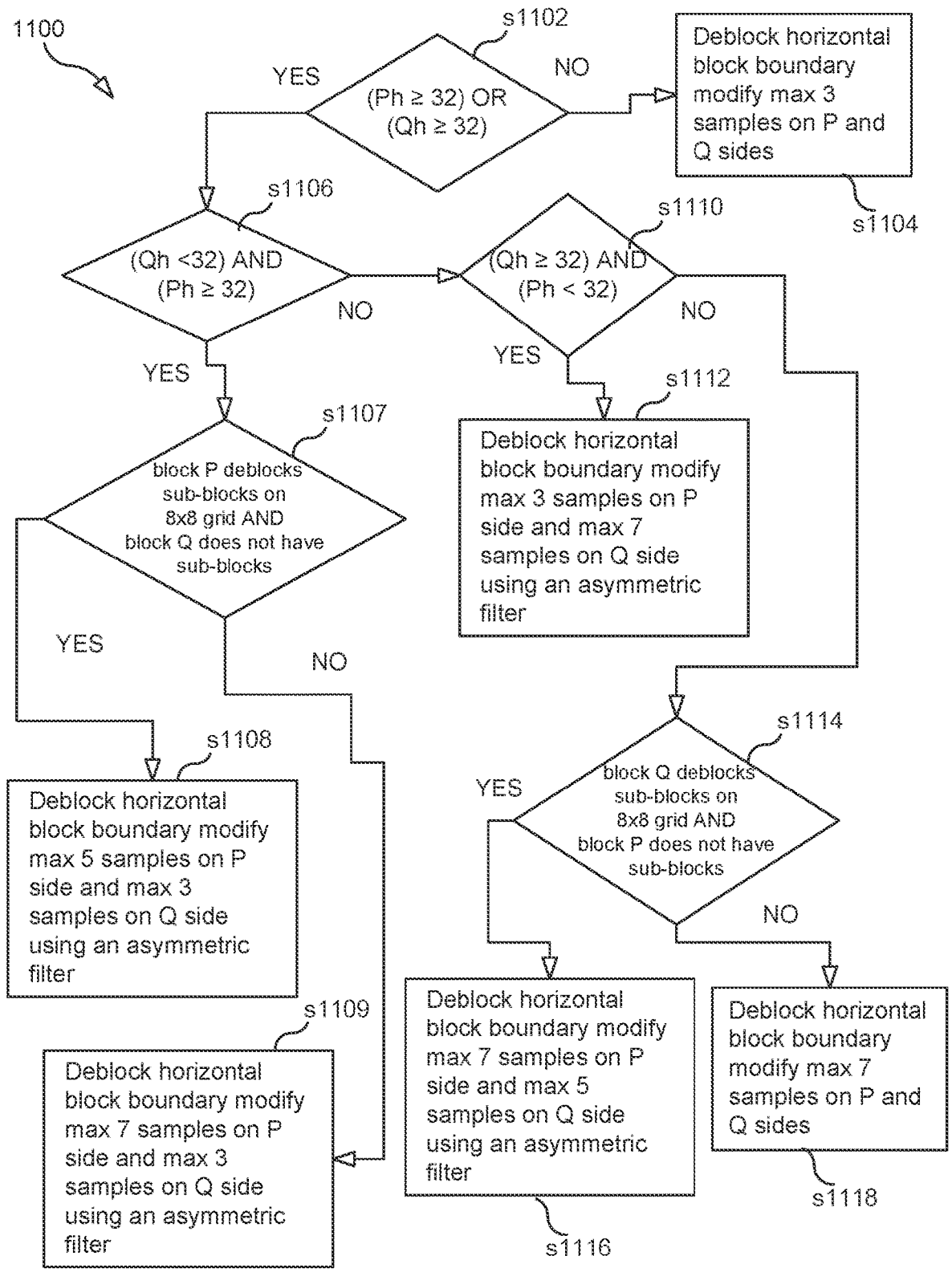
FIG. 11 is a flow chart illustrating a process according to an embodiment.

FIG. 11 is a flow chart illustrating a deblocking process 1100, according to an embodiment, for deblocking a horizontal boundary between a first block of samples (denoted block "P") and a second block of samples (denoted block "Q"). Process 1100 may begin in step s1102.

Step s1102 comprises determining whether a first condition is true, wherein the first condition is true if Ph is greater than or equal to 32 or Qh is great than or equal to 32, where Ph is the height of block P and Qh is the height of block Q. If the first condition is not true, then process 1100 proceeds to step s1104, otherwise the process proceeds to step s1106.

Step s1104 comprises deblocking the horizontal block boundary with the following restrictions: i) the maximum number of samples per column on the P side that are modified by the deblocking is 3 and ii) the maximum number of samples per column on the Q side that are modified by the deblocking is also 3. In some embodiments the maximum number of samples per column on the Q side that are modified by the deblocking is 5 if Qh is equal to 16 and the maximum number of samples per column on the P side that are modified by the deblocking is 5 if Ph is equal to 16.

Step s1106 comprises determining whether a second condition is true, where the second condition is true if Ph is greater than or equal to 32 and Qh is less than 32. If the second condition is true, then the process goes to step s1107, other the process goes to step s1110.

Step s1107 comprises determining whether a third condition is true, where the third condition is true if block P deblocks sub-blocks on an 8×8 grid and block Q does not have sub-blocks. If the third condition is true, then the process goes to step s1108, other the process goes to step s1109.

Step s1108 comprises deblocking the horizontal block boundary with the following restrictions: i) the maximum number of samples per column on the P side that are modified by the deblocking is 5 and ii) the maximum number of samples per column on the Q side that are modified by the deblocking is 3. For example, in step s1208 the asymmetric filter shown in FIG. 14 may be used. In some embodiments the maximum number of samples per column on the Q side that are modified by the deblocking is 5 if Qh is equal to 16.

Steps s1109 comprises deblocking the horizontal block boundary with the following restrictions: i) the maximum number of samples per column on the P side that are modified by the deblocking is 7 and ii) the maximum number of samples per column on the Q side that are modified by the deblocking is 3. In some embodiments the maximum number of samples per column on the Q side that are modified by the deblocking is 5 if Qh is equal to 16.

Step s1110 comprises determining whether a fourth condition is true, where the fourth condition is true if Qh is greater than or equal to 32 and Ph is less than 32. If the fourth condition is true, then the process goes to step s1112, other the process goes to step s1114.

Step s1112 comprises deblocking the horizontal block boundary with the following restrictions: i) the maximum number of samples per column on the P side that are modified by the deblocking is 3 and ii) the maximum number of samples per column on the Q side that are modified by the deblocking is 7. In some embodiments the maximum number of samples per column on the P side that are modified by the deblocking is 5 if Ph is equal to 16.

Step s1114 comprises determining whether a fifth condition is true, where the fifth condition is true if block Q deblocks sub-blocks on an 8×8 grid and block P does not have sub-blocks. If the fifth condition is true, then the process goes to step s1116, other the process goes to step s1118.

Step s1116 comprises deblocking the horizontal block boundary with the following restrictions: i) the maximum number of samples per column on the P side that are modified by the deblocking is 5 and ii) the maximum number of samples per column on the Q side that are modified by the deblocking is 7. For example, in step s1216 the asymmetric filter shown in FIG. 13 may be used.

Steps s1118 comprises deblocking the horizontal block boundary with the following restrictions: i) the maximum number of samples per column on the P side that are modified by the deblocking is 7 and ii) the maximum number of samples per column on the Q side that are modified by the deblocking is 7.

Figure 12:
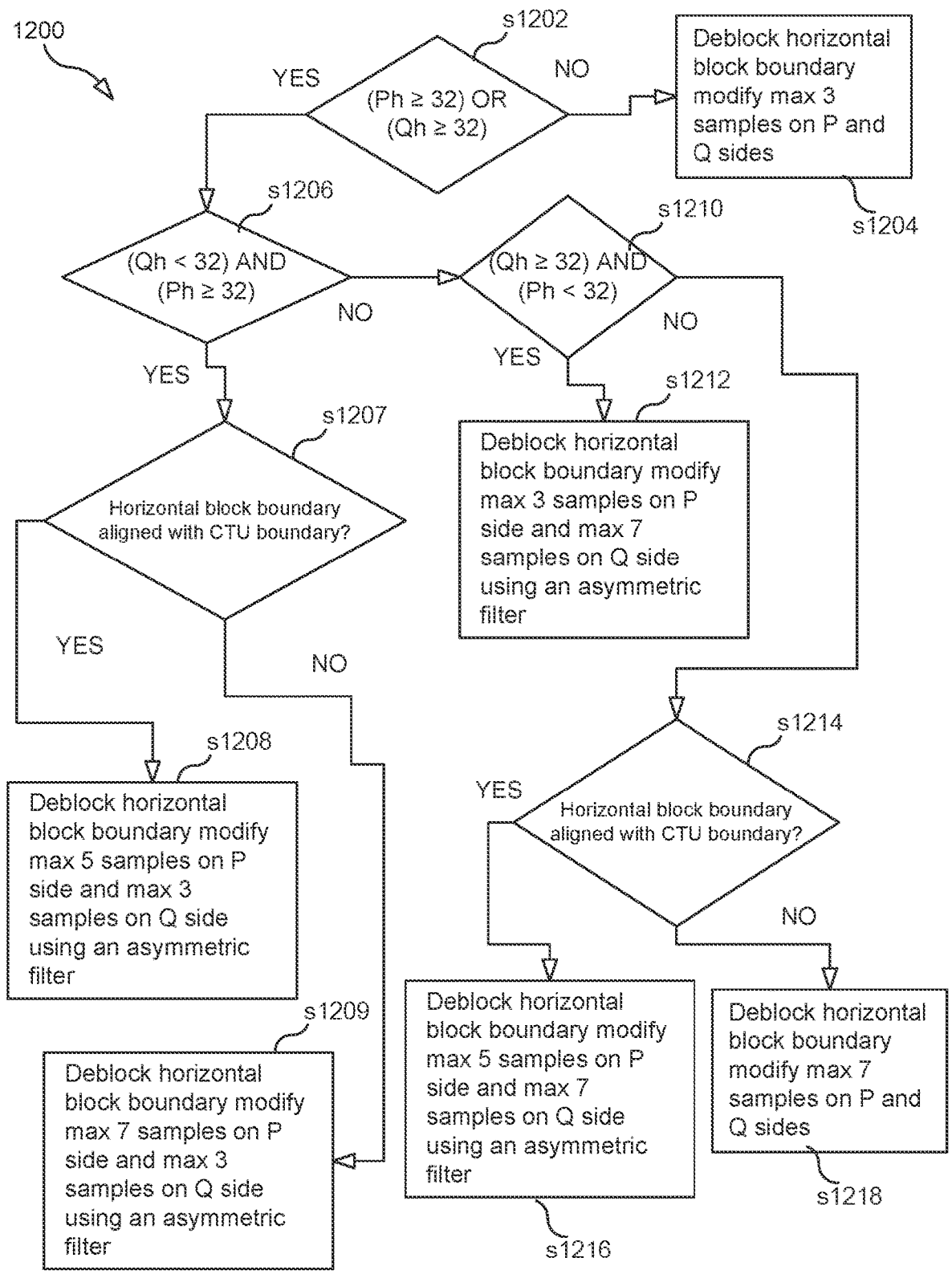
FIG. 12 is a flow chart illustrating a process according to an embodiment.

FIG. 12 is a flow chart illustrating a deblocking process 1200, according to an embodiment, for deblocking a horizontal boundary between a first block of samples (denoted block "P") and a second block of samples (denoted block "Q"). Process 1200 may begin in step s1202.

Step s1202 comprises determining whether a first condition is true, wherein the first condition is true if Ph is greater than or equal to 32 or Qh is great than or equal to 32, where Ph is the height of block P and Qh is the height of block Q. If the first condition is not true, then process 1200 proceeds to step s1204, otherwise the process proceeds to step s1206.

Step s1204 comprises deblocking the horizontal block boundary with the following restrictions: i) the maximum number of samples per column on the P side that are modified by the deblocking is 3 and ii) the maximum number of samples per column on the Q side that are modified by the deblocking is also 3. In some embodiments the maximum number of samples per column on the Q side that are modified by the deblocking is 5 if Qh is equal to 16 and the maximum number of samples per column on the P side that are modified by the deblocking is 5 if Ph is equal to 16.

Step s1206 comprises determining whether a second condition is true, where the second condition is true if Ph is greater than or equal to 32 and Qh is less than 32. If the second condition is true, then the process goes to step s1207, other the process goes to step s1210.

Step s1207 comprises determining whether a third condition is true, where the third condition is true if the horizontal block boundary is aligned with a CTU boundary. If the third condition is true, then the process goes to step s1208, other the process goes to step s1209.

Step s1208 comprises deblocking the horizontal block boundary with the following restrictions: i) the maximum number of samples per column on the P side that are modified by the deblocking is 5 and ii) the maximum number of samples per column on the Q side that are modified by the deblocking is 3. For example, in step s1208 the asymmetric filter shown in FIG. 14 may be used. In some embodiments the maximum number of samples per column on the Q side that are modified by the deblocking is 5 if Qh is equal to 16.

Steps s1209 comprises deblocking the horizontal block boundary with the following restrictions: i) the maximum number of samples per column on the P side that are modified by the deblocking is 7 and ii) the maximum number of samples per column on the Q side that are modified by the deblocking is 3. In some embodiments the maximum number of samples per column on the Q side that are modified by the deblocking is 5 if Qh is equal to 16.

Step s1210 comprises determining whether a fourth condition is true, where the fourth condition is true if Qh is greater than or equal to 32 and Ph is less than 32. If the fourth condition is true, then the process goes to step s1212, other the process goes to step s1214.

Step s1212 comprises deblocking the horizontal block boundary with the following restrictions: i) the maximum number of samples per column on the P side that are modified by the deblocking is 3 and ii) the maximum number of samples per column on the Q side that are modified by the deblocking is 7. In some embodiments the maximum number of samples per column on the P side that are modified by the deblocking is 5 if Ph is equal to 16.

Step s1214 comprises determining whether a fifth condition is true, where the fifth condition is true if the horizontal block boundary is aligned with a CTU boundary. If the fifth condition is true, then the process goes to step s1216, other the process goes to step s1218.

Step s1216 comprises deblocking the horizontal block boundary with the following restrictions: i) the maximum number of samples per column on the P side that are modified by the deblocking is 5 and ii) the maximum number of samples per column on the Q side that are modified by the deblocking is 7. For example, in step s1216 the asymmetric filter shown in FIG. 13 may be used.

Steps s1218 comprises deblocking the horizontal block boundary with the following restrictions: i) the maximum number of samples per column on the P side that are modified by the deblocking is 7 and ii) the maximum number of samples per column on the Q side that are modified by the deblocking is 7.

Figure 13:
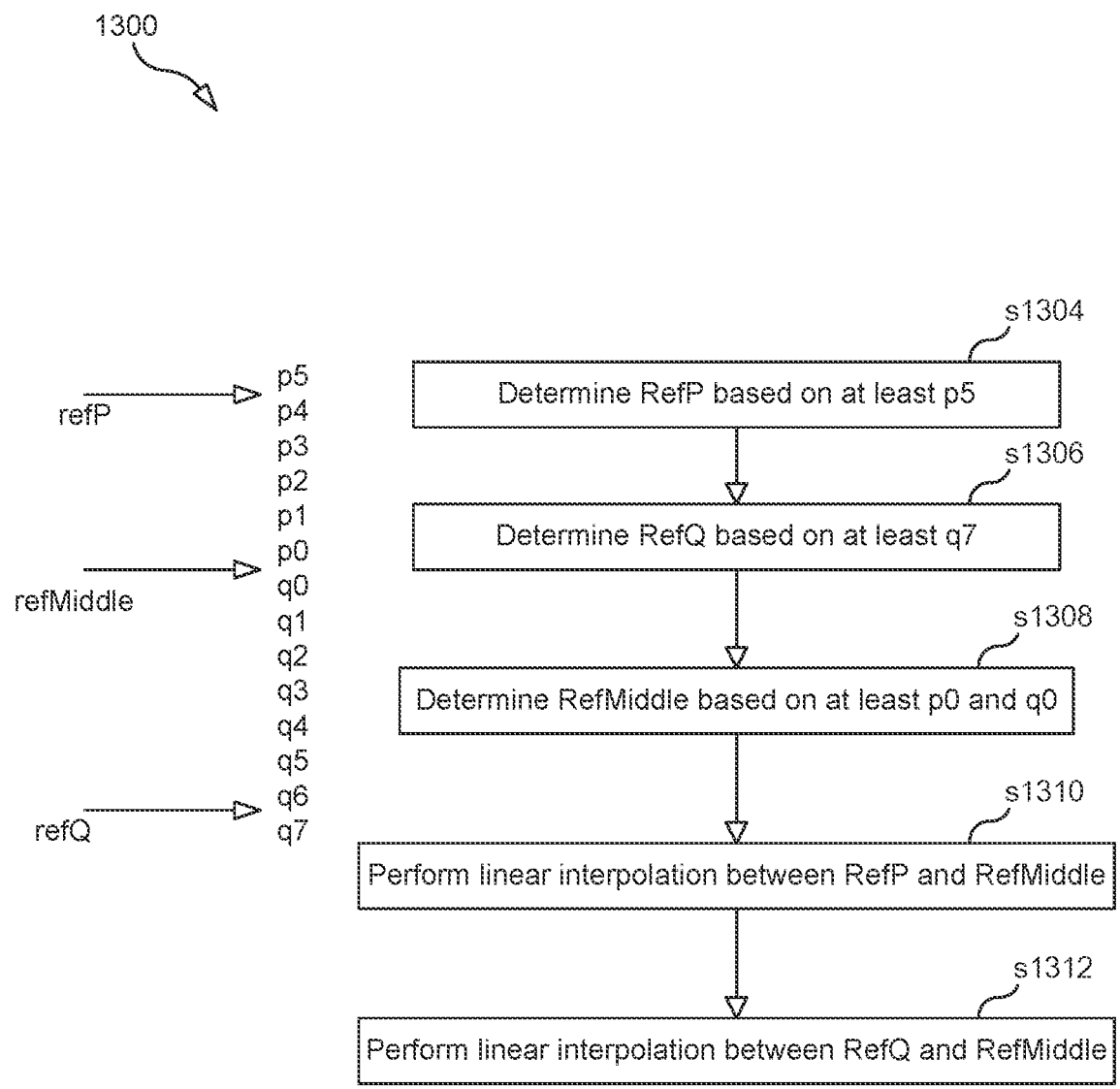
FIG. 13 is a block diagram of an apparatus according to one embodiment.

FIG. 13 is a flow chart illustrating an asymmetric deblocking process 1300, according to example 1, for deblocking a horizontal boundary between a first block of samples (denoted block "P") and a second block of samples (denoted block "Q") such that the deblocking filter modifies 5 samples on the P side and 7 samples on the Q side. FIG. 13 also shows a column of samples from the P block (i.e., samples p0, p1, p2, p3, p4, and p5) and a corresponding column of samples from the Q block (i.e., samples q0, q1, q2, q3, q4, q5, q6, and q7). The horizontal boundary is the boundary between p0 and q0. Process 1300 may begin in step s1304.

Step s1304 comprises determining refP based on at least p5. For example, in one embodiment determining refP comprises calculating refP=(p5+p4+1)>>1.

Step s1306 comprises determining refQ based on at least q7. For example, in one embodiment determining refQ comprises calculating refQ=(q6+q7+1)>>1.

Step s1308 comprises determining refMiddle based on at least p0 and q0. For example, in one embodiment refMiddle=(p5+p4+p3+p2+2*(p1+p0+q0+q1)+q2+q3+q4+ q5+8)>>4. In some alternative embodiments refMiddle= (p4+p3+2*(p2+p1+p0+q0)+q1+q2+q3+q4+q5+q6+8)>>4

Step s1310 comprises performing a linear interpolation between refP and refMiddle. For example, in one embodiment performing the linear interpolation comprises calculating p'(x)=(f(x)*refMiddle+(64−f(x))*refP+32)>>6, where x is 0 to 4, p'(x) is a filtered version of px, and f={58,45,32,19,6} where f(0)=58, f(1)=45 etc.

Step s1312 comprises performing a linear interpolation between refQ and refMiddle. For example, in one embodiment performing the linear interpolation comprises calculating q'(x)=(g(x)*refMiddle+(64−g(x))*refQ+32)>>6, where x is 0 to 6, q'(x) is a filtered version of qx, and g={59,50,41,32,23,14,5} where g(0)=59, g(1)=50 etc.

Figure 14:
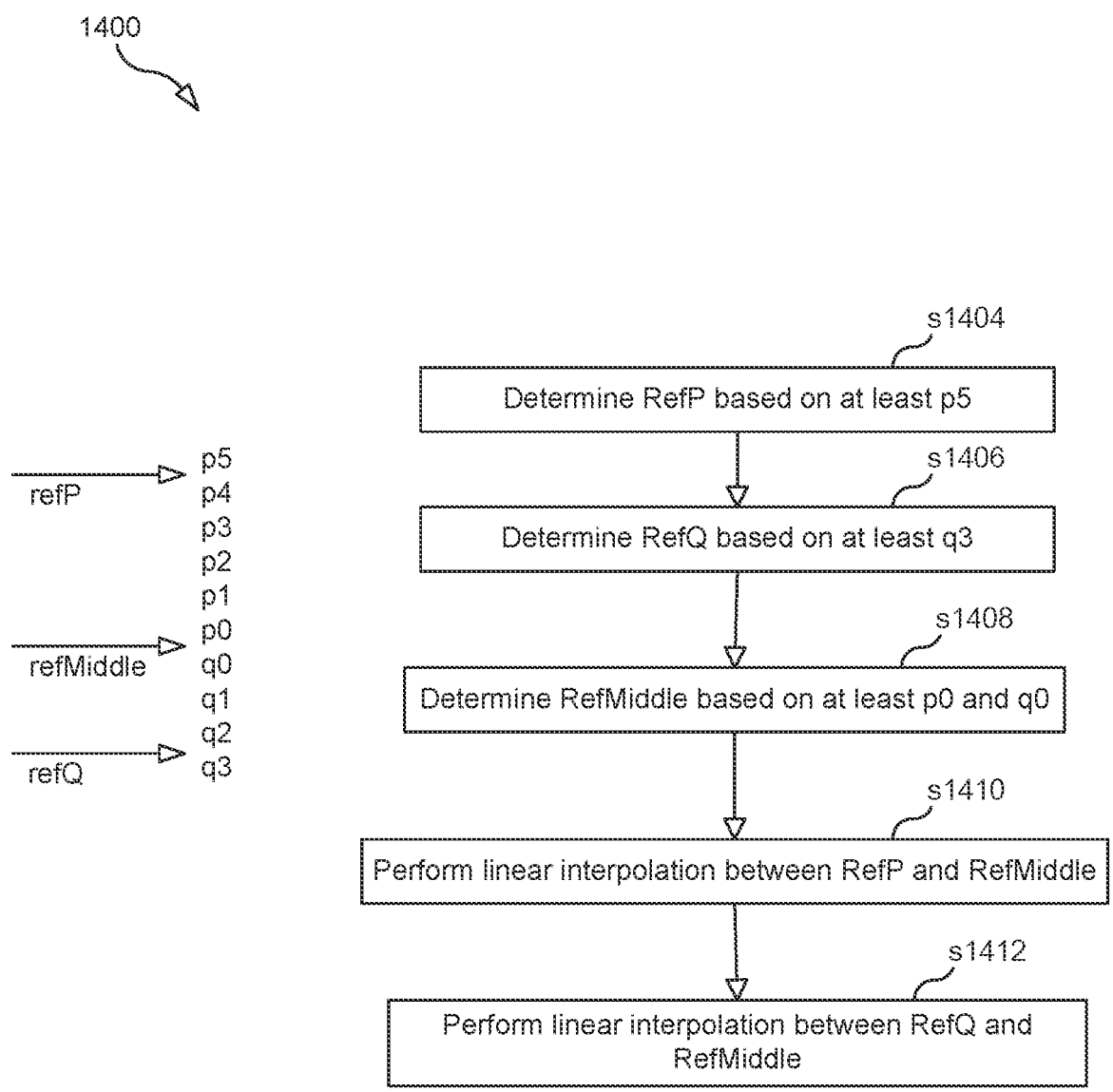
FIG. 14 is a flow chart illustrating an asymmetric deblocking process.

FIG. 14 is a flow chart illustrating an asymmetric deblocking process 1400, according to example 2, for deblocking a horizontal boundary between a first block of samples (denoted block "P") and a second block of samples (denoted block "Q") such that the deblocking filter modifies 5 samples on the P side and 3 samples on the Q side. FIG. 14 also shows a column of samples from the P block (i.e., samples p0, p1, p2, p3, p4, and p5) and a corresponding column of samples from the Q block (i.e., samples q0, q1, q2, q3, q4, q5, q6, and q7). The horizontal boundary is the boundary between p0 and q0. Process 1400 may begin in step s1404.

Step s1404 comprises determining refP based on at least p5. For example, in one embodiment determining refP comprises calculating refP=(p5+p4+1)>>1.

Step s1406 comprises determining refQ based on at least q3. For example, in one embodiment determining refQ comprises calculating refQ=(q2+q3+1)>>1.

Step s1408 comprises determining refMiddle based on at least p0 and q0. For example, in one embodiment determining refMiddle comprises calculating refMiddle=(p3+p2+p1+p0+q0+q1+q2+q3+4)>>3. In some alternative embodiments refMiddle=(q0+q1+2*(p2+p1+p0+q0+q1+q2)+p3+p4+8)>>4

Step s1410 comprises performing a linear interpolation between refP and refMiddle. For example, in one embodiment performing the linear interpolation comprises calculating p'(x)=(f(x)*refMiddle+(64−f(x))*refP+32)>>6, where x is 0 to 4, p'(x) is a filtered version of px, and f={58,45,32,19,6} where f(0)=58, f(1)=45 etc.

Step s1412 comprises performing a linear interpolation between refQ and refMiddle. For example, in one embodiment performing the linear interpolation comprises calculating q'(x)=(g(x)*refMiddle+(64−g(x))*refQ+32)>>6, where x is 0 to 2, q'(x) is a filtered version of q(x), and g={53,32,11} where g(0)=53, g(1)=32 etc.

Figure 15:
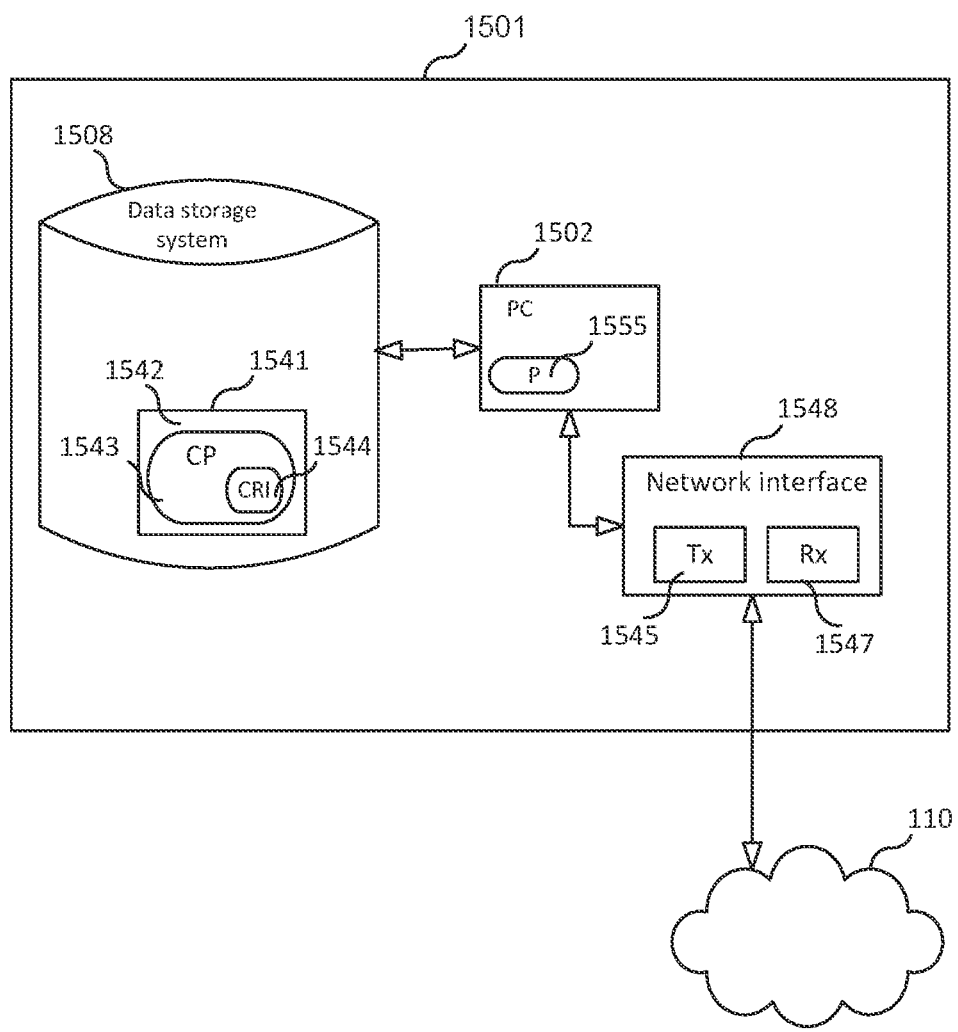
FIG. 15. is a block diagram of an apparatus according to some embodiments.

FIG. 15 is a block diagram of an apparatus 1501 for implementing encoder 402 or decoder 404, according to some embodiments. That is, apparatus 1501 can be configured to perform the methods disclosed herein. In embodiments where apparatus 1501 implements video encoder 102, apparatus 1501 may be referred to as "encoding apparatus 1501," and in embodiments where apparatus 1501 implements video decoder 104, apparatus 1501 may be referred to as a "decoding apparatus 1501." As shown in FIG. 15, network apparatus 1501 may comprise: processing circuitry (PC) 1502, which may include one or more processors (P) 1555 (e.g., one or more general purpose microprocessors and/or one or more other processors, such as an application specific integrated circuit (ASIC), field-programmable gate arrays (FPGAs), and the like), which processors may be co-located in a single housing or in a single data center or may be geographically distributed; a network interface 1548 comprising a transmitter (Tx) 1545 and a receiver (Rx) 1547 for enabling apparatus 1501 to transmit data to and receive data from other nodes connected to network 150 (e.g., an Internet Protocol (IP) network) to which network interface 1548 is connected; and a local storage unit (a.k.a., "data storage system") 1508, which may include one or more non-volatile storage devices and/or one or more volatile storage devices. In embodiments where PC 1502 includes a programmable processor, a computer program product (CPP) 1541 may be provided. CPP 1541 includes a computer readable medium (CRM) 1542 storing a computer program (CP) 1543 comprising computer readable instructions (CRI) 1544. CRM 1542 may be a non-transitory computer readable medium, such as, magnetic media (e.g., a hard disk), optical media, memory devices (e.g., random access memory, flash memory), and the like. In some embodiments, the CRI 1544 of computer program 1543 is configured such that when executed by PC 1502, the CRI causes apparatus 1501 to perform steps described herein (e.g., steps described herein with reference to the flow charts). In other embodiments, apparatus 1501 may be configured to perform steps described herein without the need for code. That is, for example, PC 1502 may consist merely of one or more ASICs. Hence, the features of the embodiments described herein may be implemented in hardware and/or software.

SUMMARY OF VARIOUS EMBODIMENTS

A1. A method (700) for deblocking a horizontal boundary between a first block of samples (denoted block "P") and a second block of samples (denoted block "Q"), the method comprising: determining whether a first condition is true, wherein the first condition is true if Ph is greater than or equal to 32 or Qh is great than or equal to 32, where Ph is the height of block P and Qh is the height of block Q; if the first condition is not true, deblocking the horizontal block boundary with the following restrictions: i) the maximum number of samples per column on the P side that are modified by the deblocking is Pmax1, where Pmax1 is equal to max(3,Ph/2-1) for deblocking on 8×8 grid and Pmax1 is equal to Ph/2-1 for deblocking on an 4×4 grid and ii) the maximum number of samples per column on the Q side that are modified by the deblocking is Qmax1, where Qmax1 is equal to max(3,Qh/2-1) for deblocking on 8×8 grid and Qmax1 is equal to Qh/2-1 for deblocking on an 4×4 grid; if the first condition is true, determining whether a second condition is true, where the second condition is true if Ph equals 16 and Qh is greater than or equal to 32; if the second condition is true, deblocking the horizontal block boundary with the following restrictions: i) the maximum number of samples per column on the P side that are modified by the deblocking is 5 and ii) the maximum number of samples per column on the Q side that are modified by the deblocking is Qh/2-1; if the second condition is not true, determining whether a third condition is true, where the third condition is true if Qh equals 16 and Ph is greater than or equal to 32; if the third condition is true, deblocking the horizontal block boundary with the following restrictions: i) the maximum number of samples per column on the Q side that are modified by the deblocking is 5 and ii) the maximum number of samples per column on the P side that are modified by the deblocking is Ph/2-1; and if the third condition is not true, deblocking the horizontal block boundary with the following restrictions: i) the maximum number of samples per column on the P side that are modified by the deblocking is Pmax1, where Pmax1 is equal to max(3,Ph/

2-1) for deblocking on 8×8 grid and Pmax1 is equal to Ph/2-1 for deblocking on an 4×4 grid and ii) the maximum number of samples per column on the Q side that are modified by the deblocking is Qmax1, where Qmax1 is equal to max(3,Qh/2-1) for deblocking on 8×8 grid and Qmax1 is equal to Qh/2-1 for deblocking on an 4×4 grid.

B1. A method (800) for deblocking a horizontal boundary between a first block of samples (denoted block "P") and a second block of samples (denoted block "Q"), the method comprising: determining whether a first condition is true, wherein the first condition is true if Ph is greater than or equal to 32 or Qh is great than or equal to 32, where Ph is the height of block P and Qh is the height of block Q; if the first condition is not true, deblocking the horizontal block boundary with the following restrictions: i) the maximum number of samples per column on the P side that are modified by the deblocking is Pmax1 where Pmax1 is equal to max(3,Ph/2-1) for deblocking on 8×8 grid and Pmax1 is equal to Ph/2-1 for deblocking on an 4×4 grid and ii) the maximum number of samples per column on the Q side that are modified by the deblocking is Qmax1 where Qmax1 is equal to max(3,Qh/2-1) for deblocking on 8×8 grid and Qmax1 is equal to Qh/2-1 for deblocking on an 4×4 grid; if the first condition is true, determining whether a second condition is true, where the second condition is true if the horizontal block boundary is aligned with a coding tree unit (CTU) boundary and Ph is greater than or equal to 32; if the second condition is true, deblocking the horizontal block boundary with the following restrictions: i) the maximum number of samples per column on the P side that are modified by the deblocking is 5 and ii) the maximum number of samples per column on the Q side that are modified by the deblocking is Qmax1 where Qmax1 is equal to max(3,Qh/2-1) for deblocking on 8×8 grid and Qmax1 is equal to Qh/2-1 for deblocking on an 4×4 grid; and if the second condition is not true, deblocking the horizontal block boundary with the following restrictions: i) the maximum number of samples per column on the P side that are modified by the deblocking is Pmax1 where Pmax1 is equal to max(3,Ph/2-1) for deblocking on 8×8 grid and Pmax1 is equal to Ph/2-1 for deblocking on an 4×4 grid and ii) the maximum number of samples per column on the Q side that are modified by the deblocking is Qmax1 where Qmax1 is equal to max(3,Qh/2-1) for deblocking on 8×8 grid and Qmax1 is equal to Qh/2-1 for deblocking on an 4×4 grid.

C1. A method (900) for deblocking a horizontal boundary between a first block of samples (denoted block "P") and a second block of samples (denoted block "Q"), the method comprising: determining whether a first condition is true, wherein the first condition is true if Ph is greater than or equal to 32 or Qh is greater than or equal to 32, where Ph is the height of block P and Qh is the height of block Q; if the first condition is not true, deblocking the horizontal block boundary with the following restrictions: i) the maximum number of samples per column on the P side that are modified by the deblocking is Pmax1, where Pmax1 is equal to max(3,Ph/2-1) for deblocking on 8×8 grid and Pmax1 is equal to Ph/2-1 for deblocking on an 4×4 grid and ii) the maximum number of samples per column on the Q side that are modified by the deblocking is Qmax1, where Qmax1 is equal to max(3,Qh/2-1) for deblocking on 8×8 grid and Qmax1 is equal to Qh/2-1 for deblocking on an 4×4 grid; if the first condition is true, determining whether a second condition is true, where the second condition is true if block P deblocks sub-blocks on an N×N grid and block Q does not have sub-blocks and Ph is greater than or equal to 32; if the second condition is true, deblocking the horizontal block boundary with the following restrictions: i) the maximum number of samples per column on the P side that are modified by the deblocking is M and ii) the maximum number of samples per column on the Q side that are modified by the deblocking is Qmax1 where Qmax1 is equal to max(3,Qh/2-1) for deblocking on 8×8 grid and Qmax1 is equal to Qh/2-1 for deblocking on an 4×4 grid. Where M is equal to 1 when N is equal to 4 and M is equal to 5 when N is 8; if the second condition is not true, determining whether a third condition is true, where the third condition is true if block Q deblocks sub-blocks on an N×N grid and block P does not have sub-blocks and Qh is greater than or equal to 32; if the third condition is true, deblocking the horizontal block boundary with the following restrictions: i) the maximum number of samples per column on the Q side that are modified by the deblocking is M and ii) the maximum number of samples per column on the P side that are modified by the deblocking is Pmax1 where Pmax1 is equal to max(3,Ph/2-1) for deblocking on 8×8 grid and Pmax1 is equal to Ph/2-1 for deblocking on an 4×4 grid. Where M is equal to 1 when N is equal to 4 and M is equal to 5 when N is 8; and if the third condition is not true, deblocking the horizontal block boundary with the following restrictions: i) the maximum number of samples per column on the P side that are modified by the deblocking is Pmax1, where Pmax1 is equal to max(3,Ph/2-1) for deblocking on 8×8 grid and Pmax1 is equal to Ph/2-1 for deblocking on an 4×4 grid and ii) the maximum number of samples per column on the Q side that are modified by the deblocking is Qmax1, where Qmax1 is equal to max(3,Qh/2-1) for deblocking on 8×8 grid and Qmax1 is equal to Qh/2-1 for deblocking on an 4×4 grid.

D1. A method (1000) for deblocking a horizontal boundary between a first block of samples (denoted block "P") and a second block of samples (denoted block "Q"), the method comprising: determining whether a first condition is true, wherein the first condition is true if Ph is greater than or equal to 32 or Qh is great than or equal to 32, where Ph is the height of block P and Qh is the height of block Q; if the first condition is not true, deblocking the horizontal block boundary with the following restrictions: i) the maximum number of samples per column on the P side that are modified by the deblocking is Pmax1, where Pmax1 is equal to max(3,Ph/2-1) for deblocking on 8×8 grid and Pmax1 is equal to Ph/2-1 for deblocking on an 4×4 grid and ii) the maximum number of samples per column on the Q side that are modified by the deblocking is Qmax1, where Qmax1 is equal to max(3,Qh/2-1) for deblocking on 8×8 grid and Qmax1 is equal to Qh/2-1 for deblocking on an 4×4 grid; if the first condition is true, determining whether a second condition is true, where the second condition is true if block P deblocks sub-blocks on 8×8 grid and block Q does not have sub-blocks and Ph is greater than or equal to 32; if the second condition is true, deblocking the horizontal block boundary with the following restrictions: i) the maximum number of samples per column on the P side that are modified by the deblocking is 5 and ii) the maximum number of samples per column on the Q side that are modified by the deblocking is Qmax1 where Qmax1 is equal to max(3,Qh/2-1) for deblocking on 8×8 grid and Qmax1 is equal to Qh/2-1 for deblocking on an 4×4 grid; if the second condition is not true, determining whether a third condition is true, where the third condition is true if block Q deblocks sub-blocks on 8×8 grid and block P does not have sub-blocks and Qh is greater than or equal to 32; if the third condition is true, deblocking the horizontal block boundary with the following restrictions: i) the maximum number of samples per column on the P side that are modified by the deblocking is Pmax1 where Pmax1 is equal to max(3,Ph/2-1) for deblocking on 8×8 grid and Pmax1 is equal to Ph/2-1 for deblocking on an 4×4 grid and ii) the maximum number of samples per column on the Q side that are modified by the deblocking is 5; and if the third condition is not true, deblocking the horizontal block boundary with the following restrictions: i) the maximum number of samples per column on the P side that are modified by the deblocking is Pmax1, where Pmax1 is equal to max(3,Ph/2-1) for deblocking on 8×8 grid and Pmax1 is equal to Ph/2-1 for deblocking on an 4×4 grid and ii) the maximum number of samples per column on the Q side that are modified by the deblocking is Qmax1, where Qmax1 is equal to max(3,Qh/2-1) for deblocking on 8×8 grid and Qmax1 is equal to Qh/2-1 for deblocking on an 4×4 grid.

E1. A method (1100) for deblocking a horizontal boundary between a first block of samples (denoted block "P") and a second block of samples (denoted block "Q"), the method comprising: determining whether a first condition is true, wherein the first condition is true if Ph is greater than or equal to 32 or Qh is great than or equal to 32, where Ph is the height of block P and Qh is the height of block Q; if the first condition is not true, deblocking the horizontal block boundary with the following restrictions: i) the maximum number of samples per column on the P side that are modified by the deblocking is 3 and ii) the maximum number of samples per column on the Q side that are modified by the deblocking is also 3; if the first condition is true, determining whether a second condition is true, where the second condition is true if Ph is greater than or equal to 32 and Qh is less than 32; if the second condition is true, determining whether a third condition is true, where the third condition is true if block P deblocks sub-blocks on an 8×8 grid and block Q does not have sub-blocks; if the second condition is not true, determining whether a fourth condition is true, where the fourth condition is true if Qh is greater than or equal to 32 and Ph is less than 32; if the third condition is true, deblocking the horizontal block boundary with the following restrictions: i) the maximum number of samples per column on the P side that are modified by the deblocking is 5 and ii) the maximum number of samples per column on the Q side that are modified by the deblocking is 3; For example, in step s1208 the asymmetric filter shown in FIG. 14 may be used; if the third condition is not true, deblocking the horizontal block boundary with the following restrictions: i) the maximum number of samples per column on the P side that are modified by the deblocking is 7 and ii) the maximum number of samples per column on the Q side that are modified by the deblocking is 3; if the fourth condition is true, deblocking the horizontal block boundary with the following restrictions: i) the maximum number of samples per column on the P side that are modified by the deblocking is 3 and ii) the maximum number of samples per column on the Q side that are modified by the deblocking is 7; if the fourth condition is not true, determining whether a fifth condition is true, where the fifth condition is true if block Q deblocks sub-blocks on an 8×8 grid and block P does not have sub-blocks; if the fifth condition is true, deblocking the horizontal block boundary with the following restrictions: i) the maximum number of samples per column on the P side that are modified by the deblocking is 5 and ii) the maximum number of samples per column on the Q side that are modified by the deblocking is 7; For example, in step s1216 the asymmetric filter shown in FIG. 13 may be used; and if the fifth condition is not true, deblocking the horizontal block boundary with the following restrictions: i) the maximum number of samples per column on the P side that are modified by the deblocking is 7 and ii) the maximum number of samples per column on the Q side that are modified by the deblocking is 7.

F1. A method (1200) for deblocking a horizontal boundary between a first block of samples (denoted block "P") and a second block of samples (denoted block "Q"), the method comprising: determining whether a first condition is true, wherein the first condition is true if Ph is greater than or equal to 32 or Qh is great than or equal to 32, where Ph is the height of block P and Qh is the height of block Q; if the first condition is not true, deblocking the horizontal block boundary with the following restrictions: i) the maximum number of samples per column on the P side that are modified by the deblocking is 3 and ii) the maximum number of samples per column on the Q side that are modified by the deblocking is also 3; if the first condition is true, determining whether a second condition is true, where the second condition is true if Ph is greater than or equal to 32 and Qh is less than 32; if the second condition is true, determining whether a third condition is true, where the third condition is true if the horizontal block boundary is aligned with a CTU boundary; if the second condition is not true, determining whether a fourth condition is true, where the fourth condition is true if Qh is greater than or equal to 32 and Ph is less than 32; if the third condition is true, deblocking the horizontal block boundary with the following restrictions: i) the maximum number of samples per column on the P side that are modified by the deblocking is 5 and ii) the maximum number of samples per column on the Q side that are modified by the deblocking is 3; For example, in step s1208 the asymmetric filter shown in FIG. 14 may be used; if the third condition is not true, deblocking the horizontal block boundary with the following restrictions: i) the maximum number of samples per column on the P side that are modified by the deblocking is 7 and ii) the maximum number of samples per column on the Q side that are modified by the deblocking is 3; if the fourth condition is true, deblocking the horizontal block boundary with the following restrictions: i) the maximum number of samples per column on the P side that are modified by the deblocking is 3 and ii) the maximum number of samples per column on the Q side that are modified by the deblocking is 7; if the fourth condition is not true, determining whether a fifth condition is true, where the fifth condition is true if the horizontal block boundary is aligned with a CTU boundary; if the fifth condition is true, deblocking the horizontal block boundary with the following restrictions: i) the maximum number of samples per column on the P side that are modified by the deblocking is 5 and ii) the maximum number of samples per column on the Q side that are modified by the deblocking is 7; For example, in step s1216 the asymmetric filter shown in FIG. 13 may be used; and if the fifth condition is not true, deblocking the horizontal block boundary with the following restrictions: i) the maximum number of samples per column on the P side that are modified by the deblocking is 7 and ii) the maximum number of samples per column on the Q side that are modified by the deblocking is 7.

G1. An asymmetric deblocking method (1300) deblocking a horizontal boundary between a first block of samples (denoted block "P") and a second block of samples (denoted block "Q") such that 5 samples on the P side and 7 samples on the Q side are modified, the method comprising: determining a value refP based on at least p5 (e.g., refP=(p5+p4+1)>>1), wherein p5 is a sixth sample in a column of samples from the P block; determining a value refQ based on at least q7 (e.g., refQ=(q6+q7+1)>>1), wherein q7 is an eighth sample in a column of samples from the Q block; determining refMiddle based on at least p0 and q0 (e.g., refMiddle=(p5+p4+p3+p2+2*(p1+p0+q0+q1)+q2+q3+q4+q5+8)>>4), wherein p0 is a first sample in the column of samples from the P block and q0 is a first sample in the column of samples from the Q block; performing a linear interpolation between refP and refMiddle; and performing a linear interpolation between refQ and refMiddle.

G2. The method of embodiment G1, wherein performing the linear interpolation between refP and refMiddle comprises calculating p'(x)=(f(x)*refMiddle+(64−f(x))*refP+32)>>6, where x is 0 to 4, p'(x) is a filtered version of px, and f={58,45,32,19,6}.

G3. The method of embodiment G1 or G2, wherein performing the linear interpolation between refQ and refMiddle comprises calculating q'(x)=(g(x)*refMiddle+(64−g(x))*refQ+32)>>6, where x is 0 to 6, q'(x) is a filtered version of qx, and g={59,50,41,32,23,14,5}.

H1. An asymmetric deblocking method (1400) for deblocking a horizontal boundary between a first block of samples (denoted block "P") and a second block of samples (denoted block "Q") such that 5 samples on the P side and 3 samples on the Q side are modified, the method comprising: determining refP based on at least p5 (e.g., refP=(p5+p4+1)>>1); determining refQ based on at least q3 (e.g., refQ=(q2+q3+1)>>1); determining refMiddle based on at least p0 and q0 (e.g., refMiddle=(p3+p2+p1+p0+q0+q1+q2+q3+4)>>3); performing a linear interpolation between refP and refMiddle; and performing a linear interpolation between refQ and refMiddle.

H2. The method of embodiment H1, wherein performing the linear interpolation between refP and refMiddle comprises calculating calculating p'(x)=(f(x)*refMiddle+(64−f(x))*refP+32)>>6, where x is 0 to 4, p'(x) is a filtered version of px, and f={58,45,32,19,6}.

H3. The method of embodiment H1 or H2, wherein performing the linear interpolation between refQ and refMiddle comprises calculating q'(x)=(g(x)*refMiddle+(64−g(x))*refQ+32)>>6, where x is 0 to 2, q'(x) is a filtered version of q(x), and g={53,32,11}.

J. An asymmetric deblocking method (1300, 1400) for deblocking a boundary between a P block of samples and a Q block of samples such that samples within the P block and samples within the Q block are modified. The method includes determining (1304, 1404) a value refP based on at least p5, wherein p5 is a sample within the P block and there are five other samples (p0, p1, p2, p3, and p4) within the P block that separate p5 from the boundary. The method also includes determining (1306, 1406) a value refQ based on at least qx, wherein qx is a sample within the P block and either i) there are three other samples (q0, q1, and q2) within the Q block that separate qx from the boundary or ii) there are seven other samples (q0, q1, q2, q3, q4, q5, and q6) within the Q block that separate qx from the boundary. The method also includes determining (1308, 1408) a value refMiddle based on at least p0 and q0, wherein p0 is directly adjacent to the boundary and q0 is directly adjacent to the boundary. The method also includes performing (1310, 1410) a linear interpolation between refP and refMiddle. And the method also includes performing (1312, 1412) a linear interpolation between refQ and refMiddle.

In one embodiment, the boundary is a vertical boundary, samples p0 to p5 are aligned in a row that is orthogonal to the vertical boundary, and samples q0 to q3 or samples q0 to q6 are aligned in the row.

In one embodiment, the boundary is a horizontal boundary, samples p0 to p5 are aligned in a column that is orthogonal to the horizontal boundary, and samples q0 to q3 or samples q0 to q6 are aligned in the column.

In one embodiment, there are seven other samples (q0, q1, q2, q3, q4, q5, and q6) within the Q block that separate qx from the boundary (i.e., qx=q7); refQ is equal to: (q6+qx+1)>>1, and refMiddle is equal to (p5+p4+p3+p2+2*(p1+p0+q0+q1)+q2+q3+q4+q5+8)>>4)

In one embodiment, performing the linear interpolation between refP and refMiddle comprises calculating p'(x)=(f(x)*refMiddle+(64−f(x))*refP+32)>>6, where x is 0 to 4, p'(x) is a filtered version of px, and f={58,45,32,19,6}.

In one embodiment, performing the linear interpolation between refQ and refMiddle comprises calculating q'(x)=(g(x)*refMiddle+(64−g(x))*refQ+32)>>6, where x is 0 to 6, q'(x) is a filtered version of qx, and g={59,50,41,32,23,14,5}.

In one embodiment, there are three other samples (q0, q1, and q2) within the Q block that separate qx from the boundary (i.e., qx=q3); refQ is equal to: (q2+qx+1)>>1, and refMiddle is equal to (p3+p2+p1+p0+q0+q1+q2+q3+4)>>3.

In one embodiment, performing the linear interpolation between refP and refMiddle comprises calculating calculating p'(x)=(f(x)*refMiddle+(64−f(x))*refP+32)>>6, where x is 0 to 4, p'(x) is a filtered version of px, and f={58,45,32,19,6}.

In one embodiment, performing the linear interpolation between refQ and refMiddle comprises calculating q'(x)=(g(x)*refMiddle+(64−g(x))*refQ+32)>>6, where x is 0 to 2, q'(x) is a filtered version of q(x), and g={53,32,11}.

In one embodiment, refP is equal to: (p5+p4+1)>>1.

In one embodiment, the P block is above or to the left of the Q block, or the P block is below or to the right of the Q block.

In one embodiment, the P block has a size in a direction orthogonal to the boundary of 32 samples, and the P block uses prediction sub-blocks.

In one embodiment, the Q block has a size in a direction orthogonal to the boundary of less than 32 samples.

In one embodiment, the Q block has a size in a direction orthogonal to the boundary of equal to or larger than 32 samples, and the Q block does not uses sub-blocks.

In one embodiment, the P block has a size in a direction orthogonal to the boundary of 32 samples, and the boundary is a horizontal coding tree unit (CTU) boundary.

In one embodiment, the process also includes, for x from 0 to 4, determining p"(x)=clip3(px+tcP$_x$, px−tcP$_x$, p'(x)), where tcP$_x$ is a clipping threshold, and $$\text{clip3}(x, y, z) = \begin{cases} x & ; & z < x \\ y & ; & z > y \\ z & ; & \text{otherwise} \end{cases}.$$

In one embodiment, the clipping threshold tcP$_x$ is a quantization parameter (QP) dependent clipping threshold.

In one embodiment, the process also includes, for x from 0 to 2, determining q"(x)=clip3(qx+tcQ$_x$, qx−tcQ$_x$, q'(x)), where tcQ$_x$ is a clipping threshold, and $$\text{clip3}(x, y, z) = \begin{cases} x & ; & z < x \\ y & ; & z > y \\ z & ; & \text{otherwise} \end{cases}.$$

In one embodiment, the clipping threshold $tcQ_x$ is a quantization parameter (QP) dependent clipping threshold.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

REFERENCES

[1] JVET-L1001, "Versatile Video Coding (Draft 3)," October 2018, available at phenix.it-sudparis.eu/jvet/doc_end_user/documents/12_Macao/wg11/JVET-L1001-v13.zip

[2] JVET-L1031, "Description of Core Experiment 11 (CE11): Deblocking," October 2018, available at phenix.it-sudparis.eu/jvet/doc_end_user/documents/12_Macao/wg11/JVET-L1031-v3.zip

[3] JVET-L0072, "CE11: Long deblocking filters for luma (CE11.1.1) and for both luma and chroma (CE11.1.9)", October 2018, available at phenix.it-sudparis.eu/jvet/doc_end_user/documents/12_Macao/wg11/JVET-L0072-v1.zip

The invention claimed is:

1. A method for filtering sample values, the method comprising:
   obtaining a set of sample values, the set of sample values comprising the following sample values: p5, p4, p3, p2, p1, p0, q0, q1, q2, q3, q4, q5, q6, and q7;
   determining a value refP, wherein refP is equal to: (p5+p4+1)>>1;
   determining a value refQ, wherein
   i) when a maximum filter length value (maxLengthQ) is equal to 3, refQ is equal to: (q3+q2+1)>>1, or
   ii) when maxLengthQ is equal to 7, refQ is equal to: (q7+q6+1)>>1;
   determining a value refMiddle, wherein
   i) in the case that refQ is equal to (q3+q2+1)>>1, refMiddle is equal: to (p3+p2+p1+p0+q0+q1+q2+q3+4)>>3, or
   ii) in the case that refQ is equal to (q7+q6+1)>>1, refMiddle is equal to: (p5+p4+p3+p2+2*(p1+p0+q0+q1)+q2+q3+q4+q5+8)>>4);
   calculating a filtered sample value p0', wherein p0' is equal to: (refMiddle*f0+refP*(64−f0)+32)>>6, where f0=58; and
   calculating a filtered sample value q0', wherein q0' is equal to (refMiddle*g0+refQ*(64−g0)+32)>>6, where g0=59 or g0=53.

2. The method of claim 1, wherein
   sample values p0 to p5 correspond to six samples that are aligned in a row that is orthogonal to a vertical boundary, and
   samples q0 to q7 correspond to eight samples that are aligned in the row.

3. The method of claim 1, wherein
   sample values p0 to p5 correspond to six samples that are aligned in a column that is orthogonal to a horizontal boundary, and
   samples q0 to q7 correspond to eight samples that are aligned in the column.

4. The method of claim 1, further comprising:
   determining that the value p0' is not less than a first threshold and not greater than a second threshold; and
   as a result of determining that the value p0' is not less than the first threshold and not greater than the second threshold, replacing the value p0 with the value p0'.

5. The method of claim 4, further comprising:
   determining that the value q0' is not less than a third threshold and not greater than a fourth threshold; and
   as a result of determining that the value q0' is not less than the third threshold and not greater than the fourth threshold, replacing the value q0 with the value q0'.

6. The method of claim 5, further comprising:
   calculating a filtered sample value p1', wherein p1' is equal to: (refMiddle*f1+refP*(64−f1)+32)>>6, where f1=45; and
   calculating a filtered sample value q1', wherein q1' is equal to (refMiddle*g1+refQ*(64−g1)+32)>>6, where g1=50 or g1=32.

7. The method of claim 6, further comprising:
   determining that the value p1' is not less than the first threshold and not greater than the second threshold; and
   as a result of determining that the value p1' is not less than the first threshold and not greater than the second threshold, replacing the value p1 with the value p1'.

8. The method of claim 7, further comprising:
   determining that the value q1' is not less than the third threshold and not greater than the fourth threshold; and
   as a result of determining that the value q1' is not less than the third threshold and not greater than the fourth threshold, replacing the value q1 with the value q1'.

9. The method of claim 1, wherein
   obtaining the set of sample values comprising obtaining a matrix of sample values, wherein the matrix of sample values comprise the set of sample values, and
   sample value p0 is immediately adjacent to sample value q0 within the matrix of sample values.

10. A computer program product comprising a non-transitory computer readable medium storing a computer program comprising instructions which when executed by processing circuitry causes the processing circuitry to perform the method of claim 1.

11. An apparatus for filtering sample values, the apparatus comprising:
    processing circuitry; and
    a memory, wherein the apparatus is configured to:
    obtain a set of sample values, the set of sample values comprising the following sample values: p5, p4, p3, p2, p1, p0, q0, q1, q2, q3, q4, q5, q6, and q7;
    determine a value refP, wherein refP is equal to: (p5+p4+1)>>1;
    determine a value refQ, wherein
    i) when a maximum filter length value (maxLengthQ) is equal to 3, refQ is equal to: (q3+q2+1)>>1, or
    ii) when maxLengthQ is equal to 7, refQ is equal to: (q7+q6+1)>>1;
    determine a value refMiddle, wherein
    i) in the case that refQ is equal to (q3+q2+1)>>1, refMiddle is equal: to (p3+p2+p1+p0+q0+q1+q2+q3+4)>>3, or ii) in the case that refQ is equal to $(q7+q6+1)\gg 1$, refMiddle is equal to: $(p5+p4+p3+p2+2*(p1+p0+q0+q1)+q2+q3+q4+q5+8)\gg 4)$;

calculate a filtered sample value p0', wherein p0' is equal to: $(refMiddle*f0+refP*(64-f0)+32)\gg 6$, where f0=58; and calculate a filtered sample value q0', wherein q0' is equal to $(refMiddle*g0+refQ*(64-g0)+32)\gg 6$, where g0=59 or g0=53.

12. The apparatus of claim 11, wherein sample values p0 to p5 correspond to six samples that are aligned in a row that is orthogonal to a vertical boundary, and samples q0 to q7 correspond to eight samples that are aligned in the row.

13. The apparatus of claim 11, wherein sample values p0 to p5 correspond to six samples that are aligned in a column that is orthogonal to a horizontal boundary, and samples q0 to q7 correspond to eight samples that are aligned in the column.

14. The apparatus of claim 11, wherein the apparatus is further configured to:

determine whether the value p0' is not less than a first threshold and not greater than a second threshold; and as a result of determining that the value p0' is not less than the first threshold and not greater than the second threshold, replace the value p0 with the value p0'.

15. The apparatus of claim 14, wherein the apparatus is further configured to:

determine whether the value q0' is not less than a third threshold and not greater than a fourth threshold; and as a result of determining that the value q0' is not less than the third threshold and not greater than the fourth threshold, replace the value q0 with the value q0'.

16. The apparatus of claim 15, wherein the apparatus is further configured to:

calculate a filtered sample value p1', wherein p1' is equal to: $(refMiddle*f1+refP*(64-f1)+32)\gg 6$, where f1=45; and calculate a filtered sample value q1', wherein q1' is equal to $(refMiddle*g1+refQ*(64-g1)+32)\gg 6$, where g1=50 or g1=32.

17. The apparatus of claim 16, wherein the apparatus is further configured to:

determine whether the value p1' is not less than the first threshold and not greater than the second threshold; and as a result of determining that the value p1' is not less than the first threshold and not greater than the second threshold, replace the value p1 with the value p1'.

18. The apparatus of claim 17, wherein the apparatus is further configured to:

determine whether the value q1' is not less than the third threshold and not greater than the fourth threshold; and as a result of determining that the value q1' is not less than the third threshold and not greater than the fourth threshold, replace the value q1 with the value q1'.

19. The apparatus of claim 11, wherein obtaining the set of sample values comprising obtaining a matrix of sample values, wherein the matrix of sample values comprise the set of sample values, and sample value p0 is immediately adjacent to sample value q0 within the matrix of sample values.

* * * * *

UNITED STATES PATENT AND TRADEMARK OFFICE
CERTIFICATE OF CORRECTION

| | | |
|---|---|---|
| PATENT NO. | : 12,003,785 B2 | Page 1 of 2 |
| APPLICATION NO. | : 18/132889 | |
| DATED | : June 4, 2024 | |
| INVENTOR(S) | : Andersson et al. | |

It is certified that error appears in the above-identified patent and that said Letters Patent is hereby corrected as shown below:

In the Drawings

Figure 1:
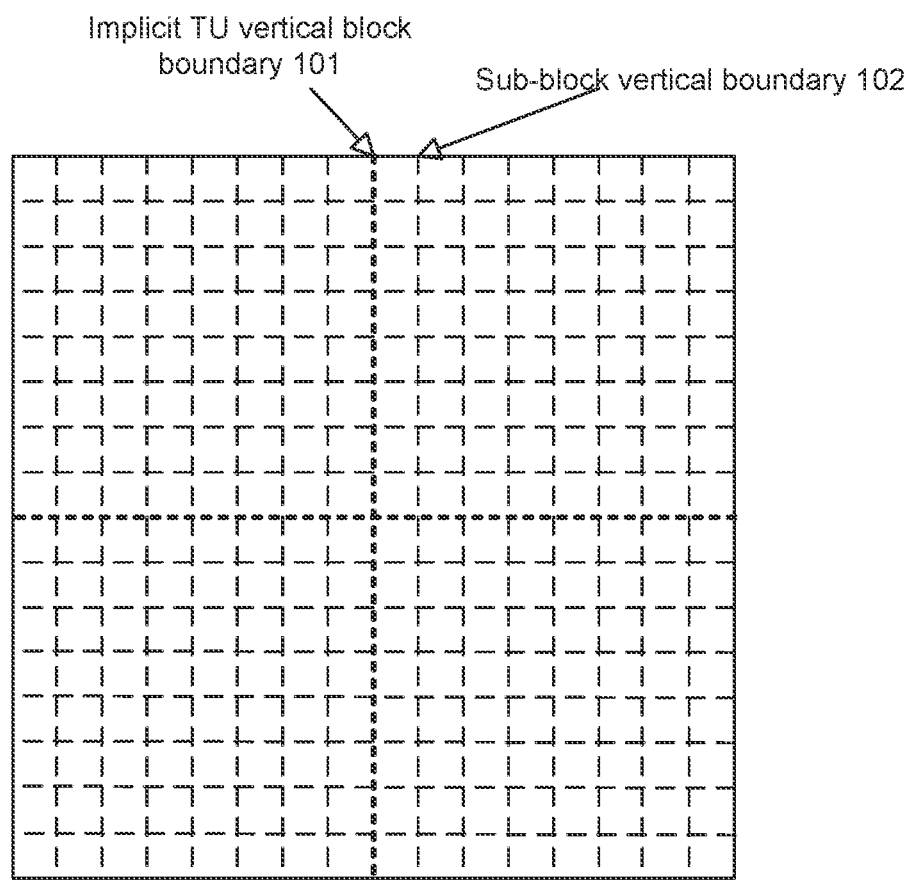
FIG. 1 shows an example of a vertical block boundary and a vertical sub-block boundary.
Figure 2A:
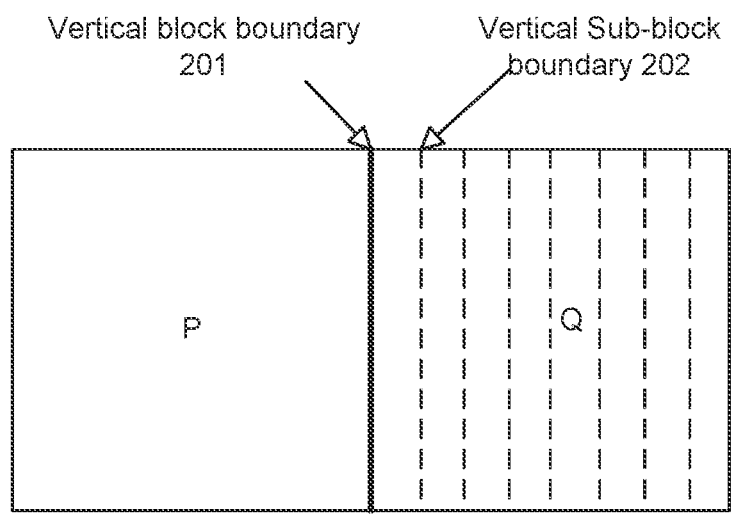
FIG. 2A shows another example of a vertical block boundary and a vertical sub-block boundary.
Figure 2B:
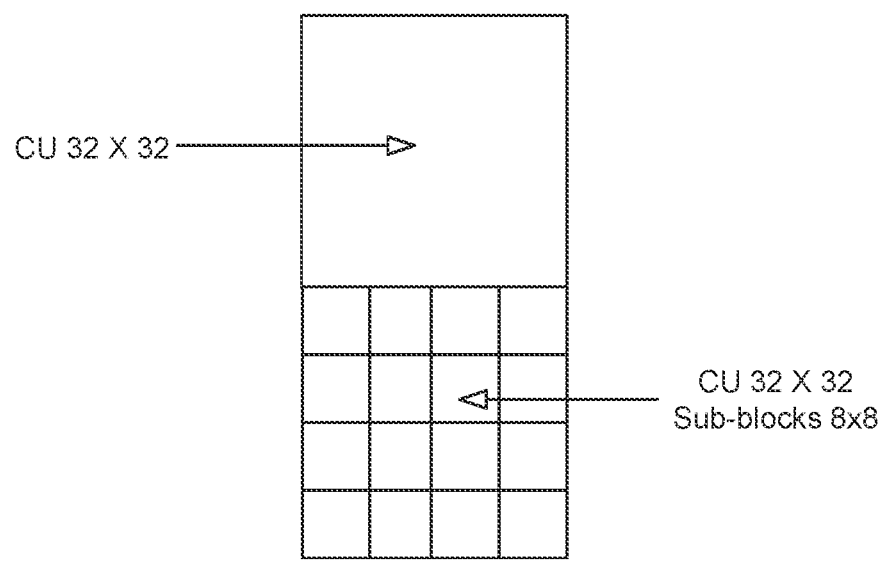
FIG. 2B shows a horizontal boundary between two blocks.
Figure 3A:
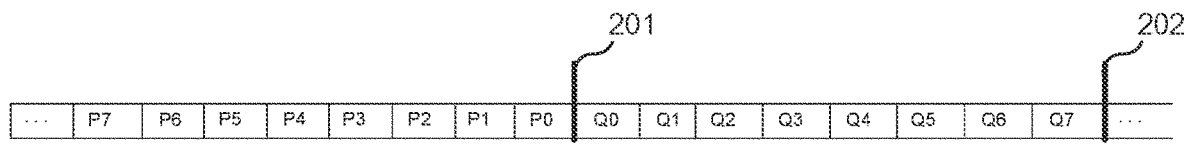
FIG. 3A illustrates a first set of samples on one side of a vertical block boundary and a corresponding second set of samples on the other side of the vertical block boundary.
Figure 3B:
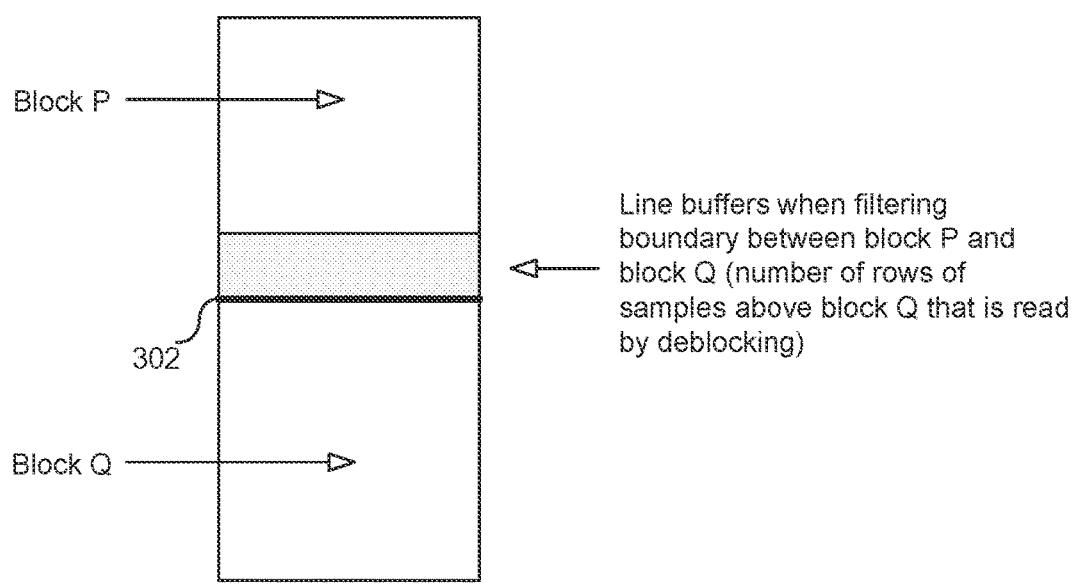
FIG. 3B shows an example line buffer

In Fig. 1, Sheet 1 of 15, and on the Title Page, the illustrative print figure, for Tag "102", in Line 1, delete "Sub-block vertical boundary" and insert -- Vertical Sub-block boundary --, therefor.

In the Specification

In Column 2, Line 10, delete "(PDFD)," and insert -- (PFD), --, therefor.

In Columns 3 & 4, in Table, Line 13, delete "Middle$_{3.7}$" and insert -- Middle$_{3,7}$ --, therefor.

In Column 5, Line 3, delete "II" and insert -- ∥ --, therefor.

In Columns 13 & 14, in Table, Line 3, delete "Middle5, 7" and insert -- Middle$_{5,7}$ --, therefor.

In Column 15, Line 9, delete "Middle5, 3" and insert -- Middle$_{5,3}$ --, therefor.

In Columns 15 & 16, in Table 2, Line 3, delete "Middle7,5" and insert -- Middle$_{7,5}$ --, therefor.

In Columns 15 & 16, in Table 2, Line 7, delete "Middle5,7" and insert -- Middle$_{5,7}$ --, therefor.

In Columns 15 & 16, in Table 2, Line 11, delete "Middle5,5" and insert -- Middle$_{5,5}$ --, therefor.

In Columns 15 & 16, in Table 2, Line 15, delete "Middle5,3" and insert -- Middle$_{5,3}$ --, therefor.

In Columns 15 & 16, in Table 2, Line 19, delete "Middle3,5" and insert -- Middle$_{3,5}$ --, therefor.

In Columns 15 & 16, in Table 3, Line 3, delete "Middle7,5" and insert -- Middle$_{7,5}$ --, therefor.

In Columns 15 & 16, in Table 3, Line 7, delete "Middle5,7" and insert -- Middle$_{5,7}$ --, therefor.

Signed and Sealed this
Twenty-second Day of April, 2025

Coke Morgan Stewart
*Acting Director of the United States Patent and Trademark Office*

CERTIFICATE OF CORRECTION (continued)
U.S. Pat. No. 12,003,785 B2

In Columns 15 & 16, in Table 3, Line 11, delete "Middle5,5" and insert -- $Middle_{5,5}$ --, therefor.

In Columns 17 & 18, Line 37, delete "Middle7,5" and insert -- $Middle_{7,5}$ --, therefor.

In Columns 17 & 18, Line 42, delete "Middle5,7" and insert -- $Middle_{5,7}$ --, therefor.

In Column 19, Line 3, delete "II" and insert -- ∥ --, therefor.

In Column 20, Line 35, delete "Middle5,5" and insert -- $Middle_{5,5}$ --, therefor.

In Column 20, Line 66, delete "great" and insert -- greater --, therefor.

In Column 21, Line 55, delete "great" and insert -- greater --, therefor.

In Column 22, Line 32, delete "great" and insert -- greater --, therefor.

In Column 23, Line 29, delete "great" and insert -- greater --, therefor.

In Column 24, Line 24, delete "great" and insert -- greater --, therefor.

In Column 25, Line 40, delete "great" and insert -- greater --, therefor.

In Column 28, Line 35, delete "great" and insert -- greater --, therefor.

In Column 29, Line 12, delete "great" and insert -- greater --, therefor.

In Column 29, Line 51, delete "great" and insert -- greater --, therefor.

In Column 30, Line 38, delete "great" and insert -- greater --, therefor.

In Column 31, Line 22, delete "great" and insert -- greater --, therefor.

In Column 32, Line 10, delete "great" and insert -- greater --, therefor.